S. F. SMITH.
COMPUTING AND RECORDING MACHINE.
APPLICATION FILED AUG. 15, 1911.

1,278,049.

Patented Sept. 3, 1918.
12 SHEETS—SHEET 2.

WITNESSES:
N. B. Keating
Leon Boillot

INVENTOR
Stuart F. Smith
BY
Fm. Wright.
ATTORNEY

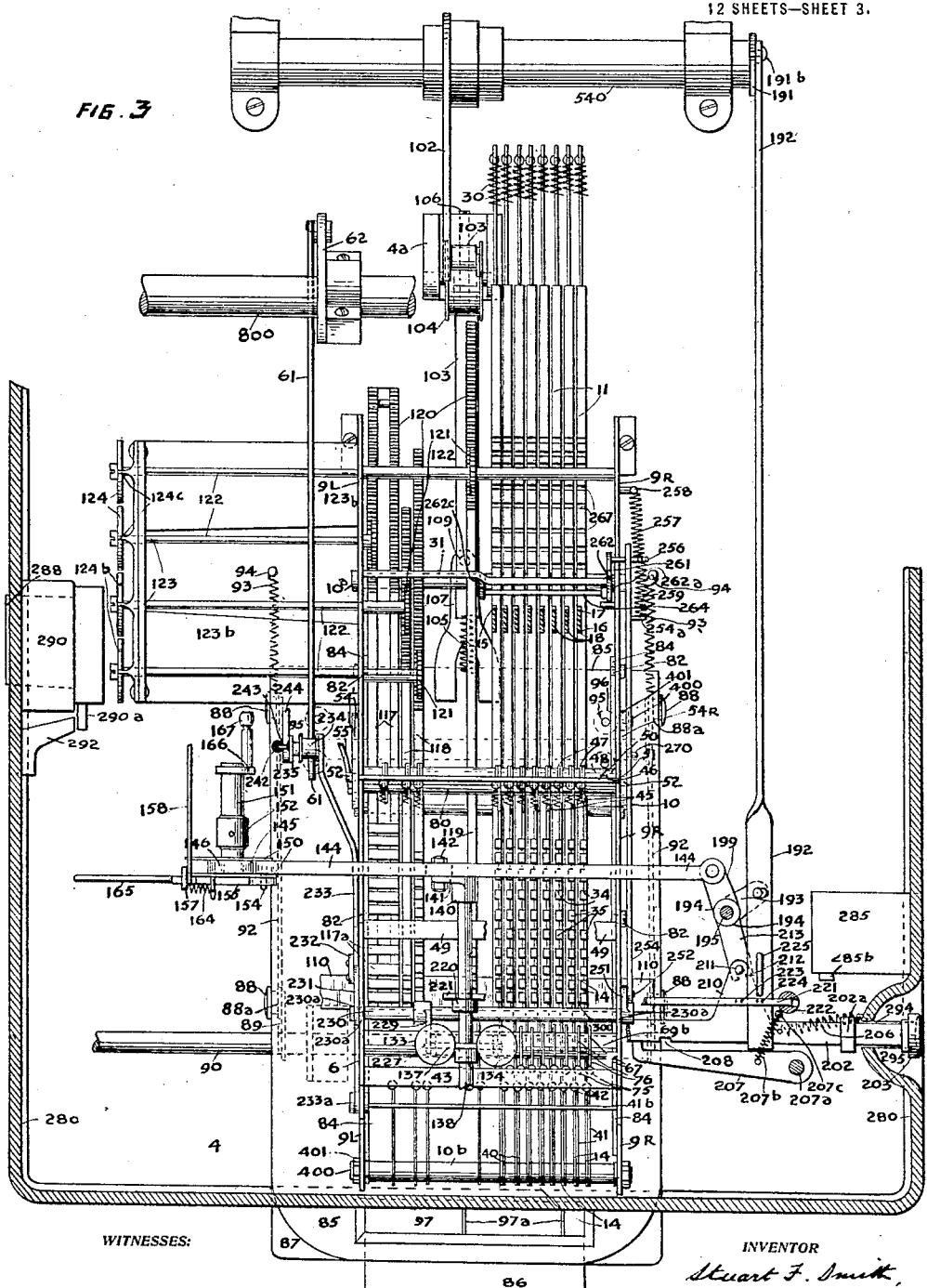

S. F. SMITH.
COMPUTING AND RECORDING MACHINE.
APPLICATION FILED AUG. 15, 1911.
1,278,049.
Patented Sept. 3, 1918.
12 SHEETS—SHEET 4.
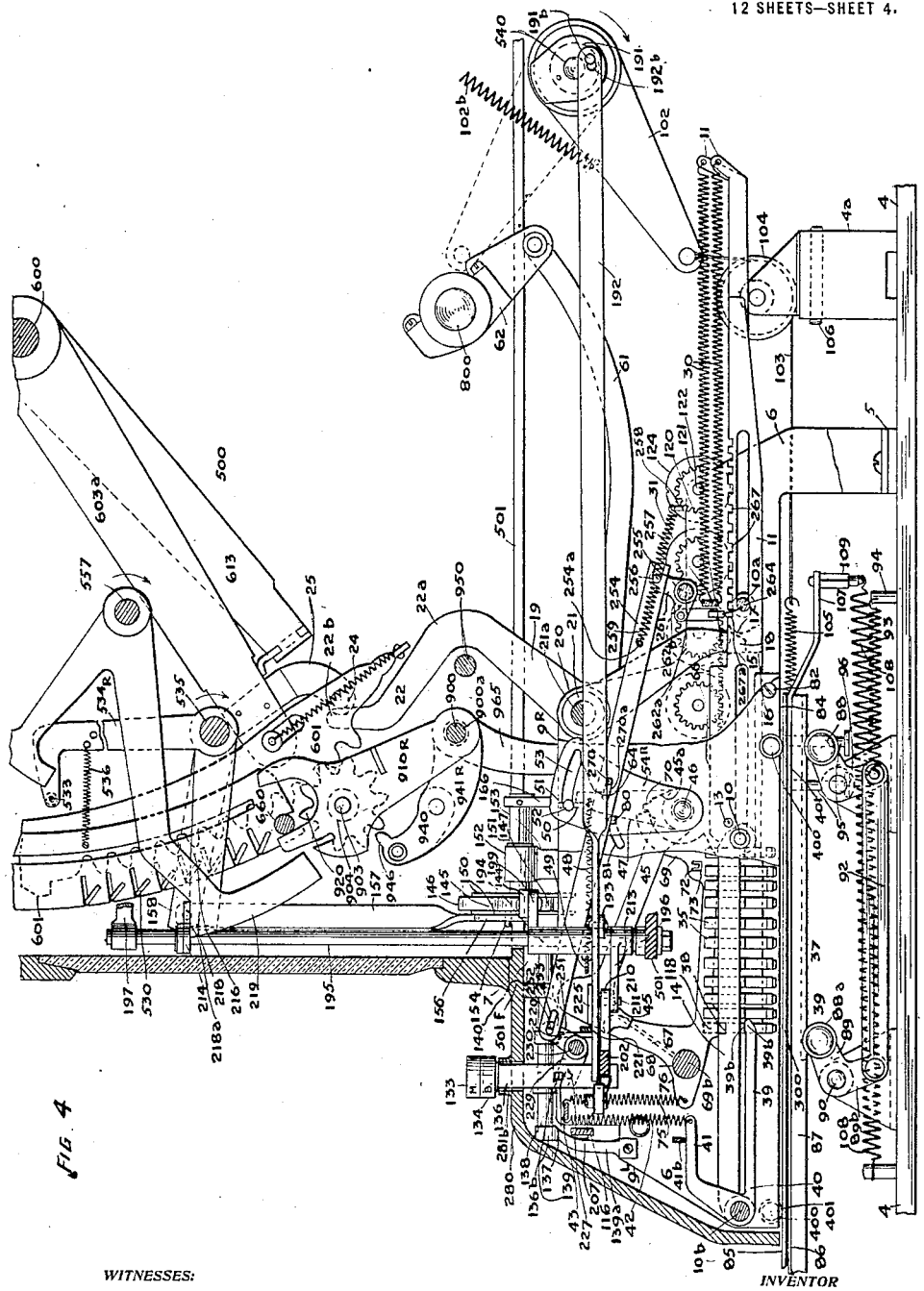
WITNESSES:
INVENTOR
Stuart F. Smith
BY
F. M. Wright
ATTORNEY

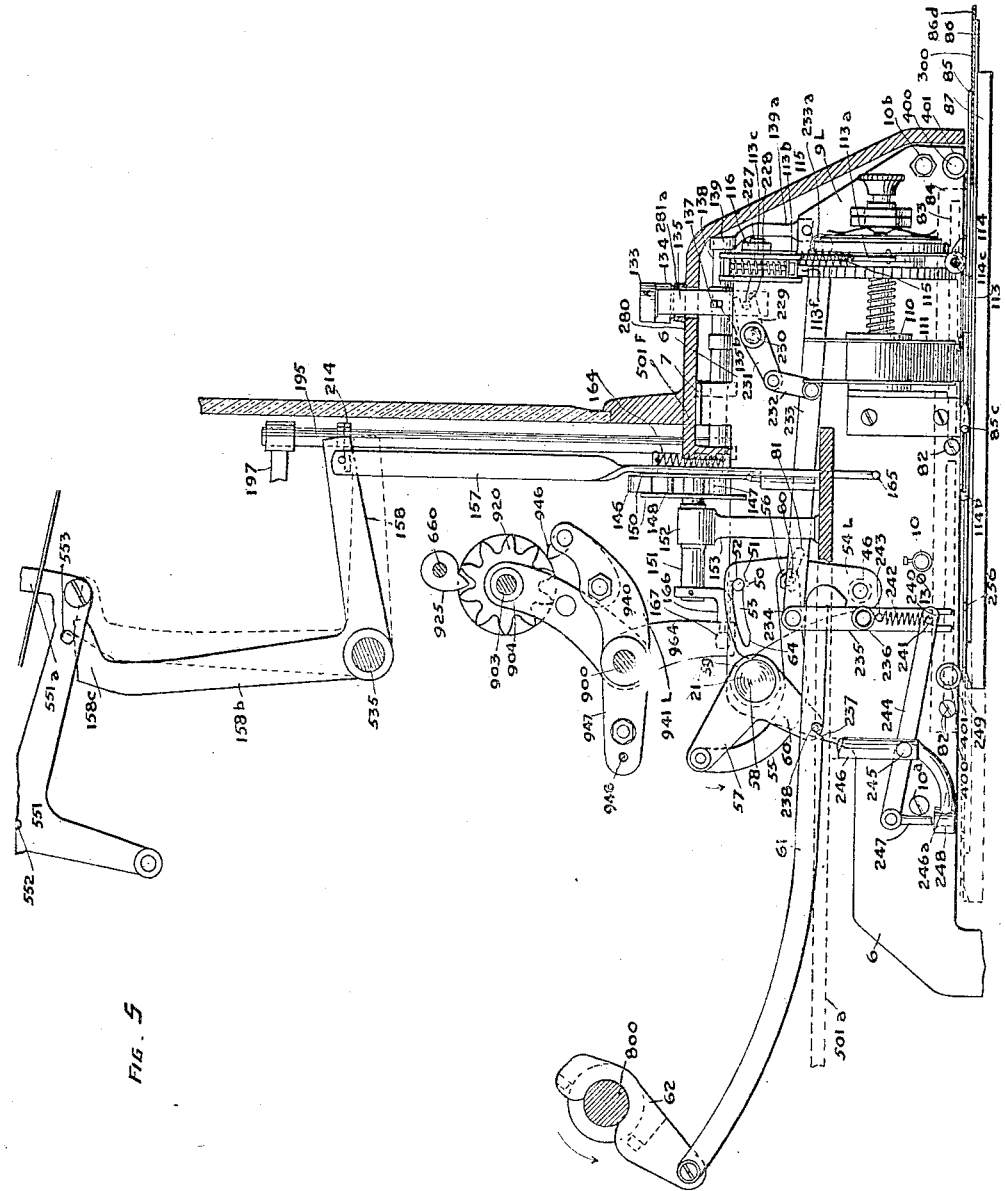

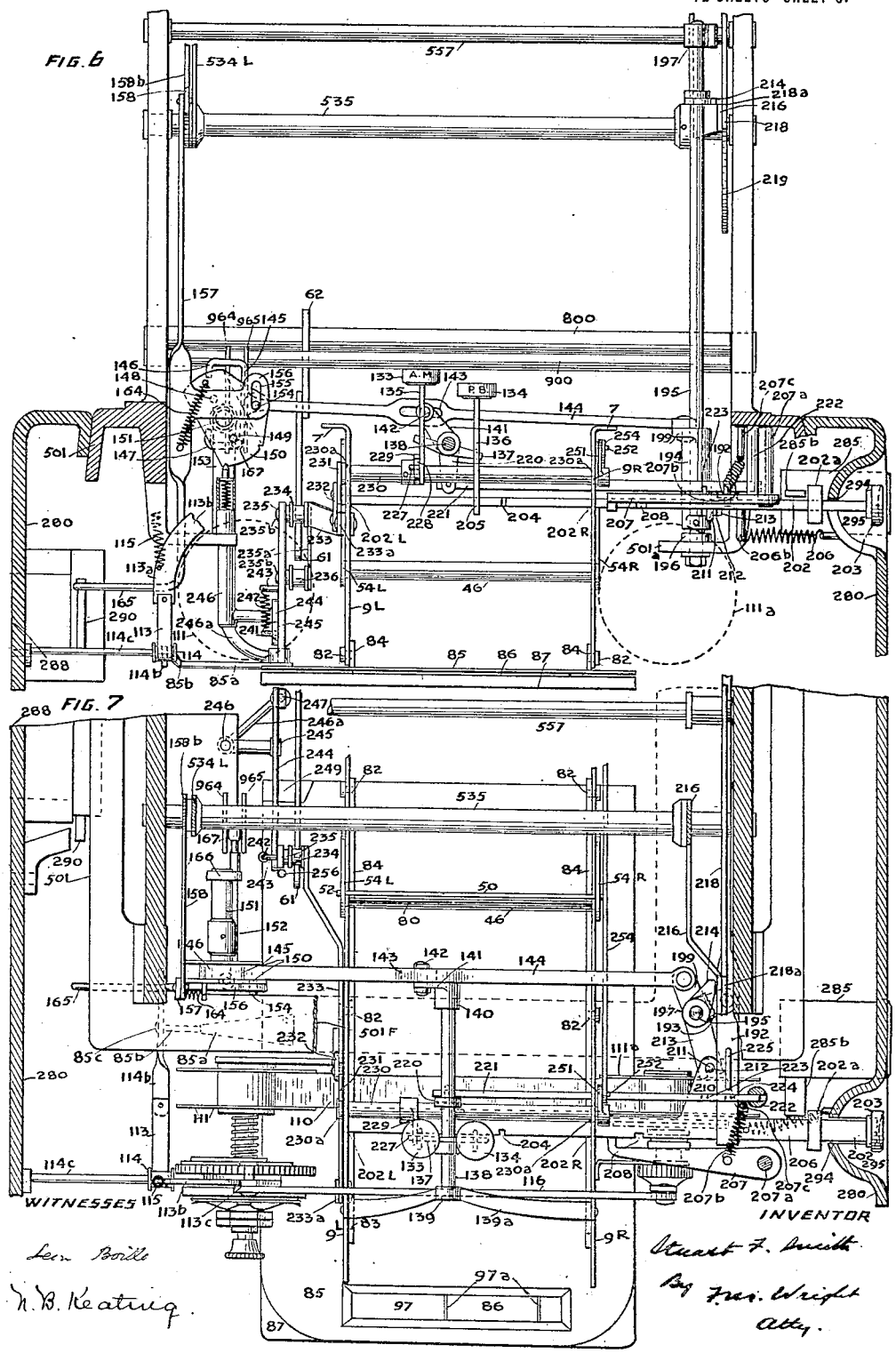

S. F. SMITH.
COMPUTING AND RECORDING MACHINE.
APPLICATION FILED AUG. 15, 1911.
1,278,049.
Patented Sept. 3, 1918.
12 SHEETS—SHEET 7.
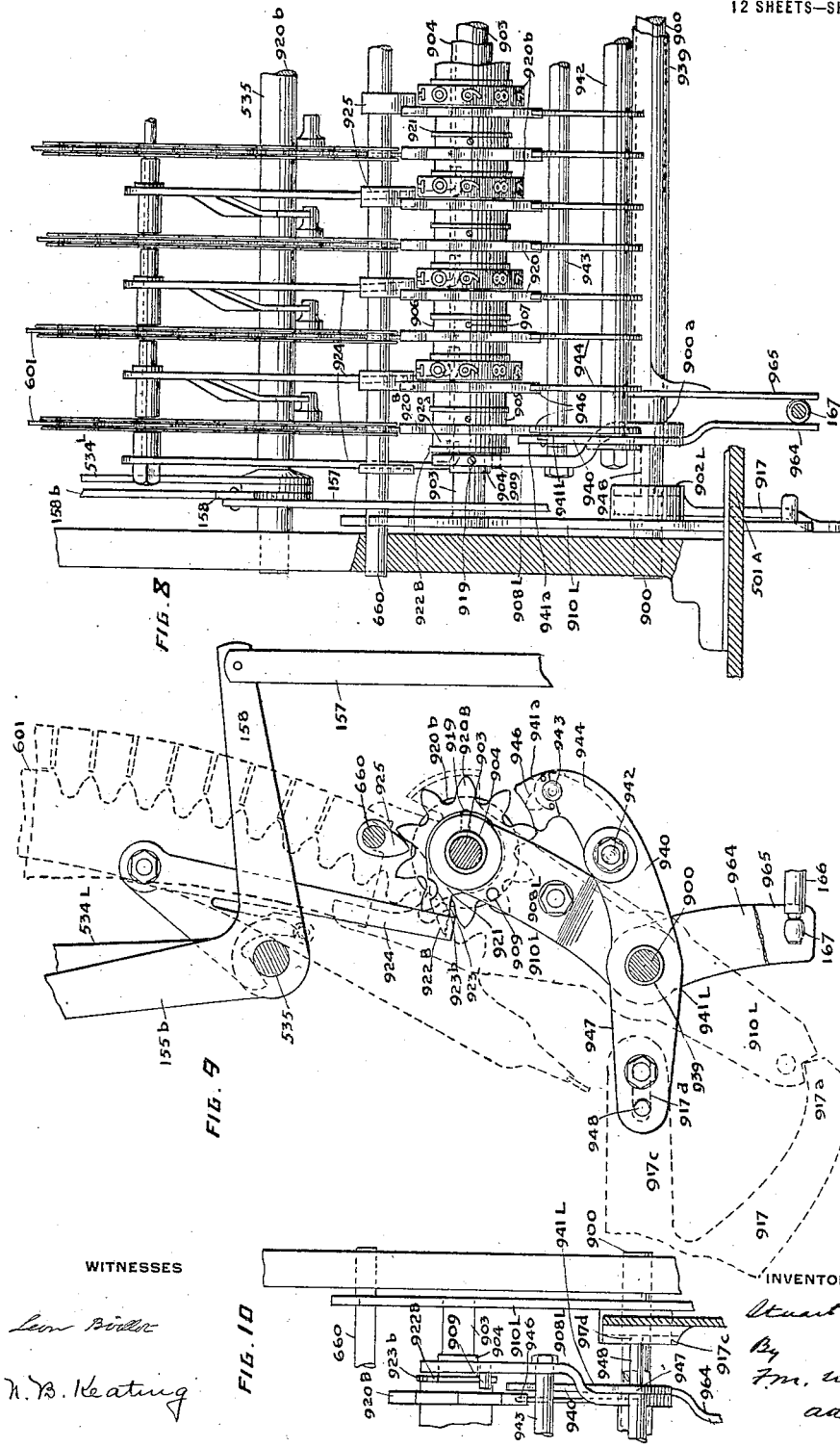

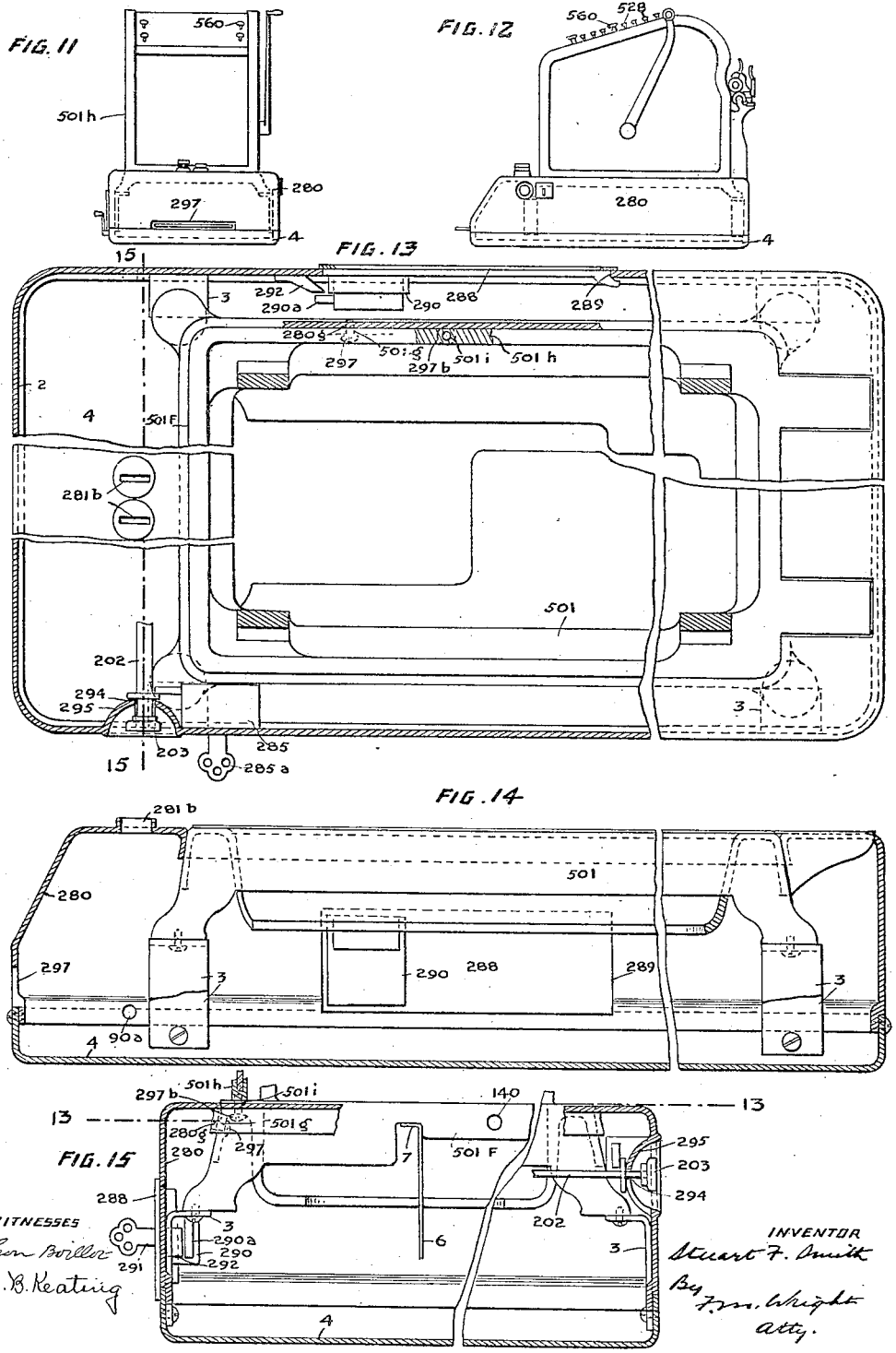

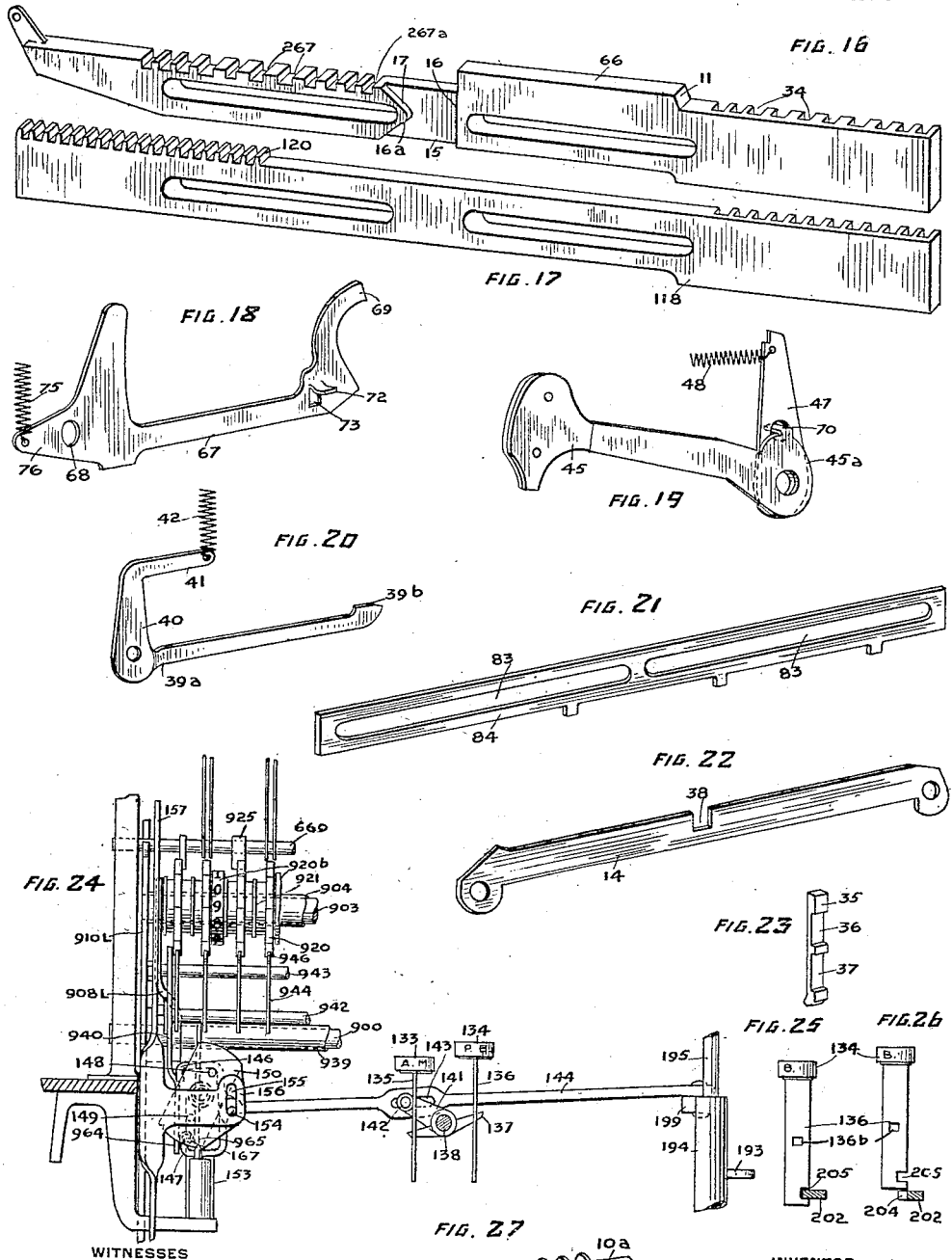

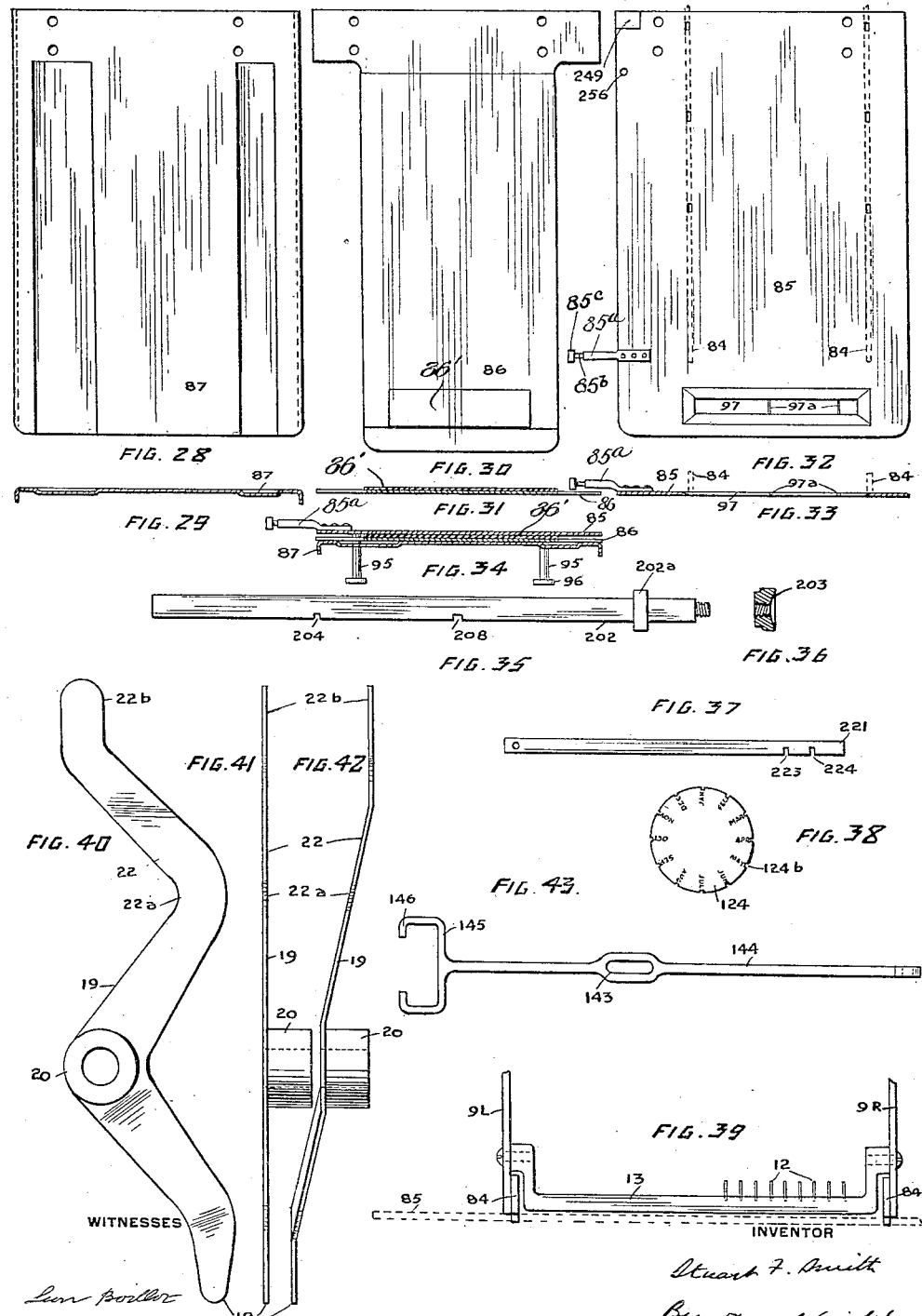

S. F. SMITH.
COMPUTING AND RECORDING MACHINE.
APPLICATION FILED AUG. 15, 1911.
1,278,049.
Patented Sept. 3, 1918.
12 SHEETS—SHEET 11.
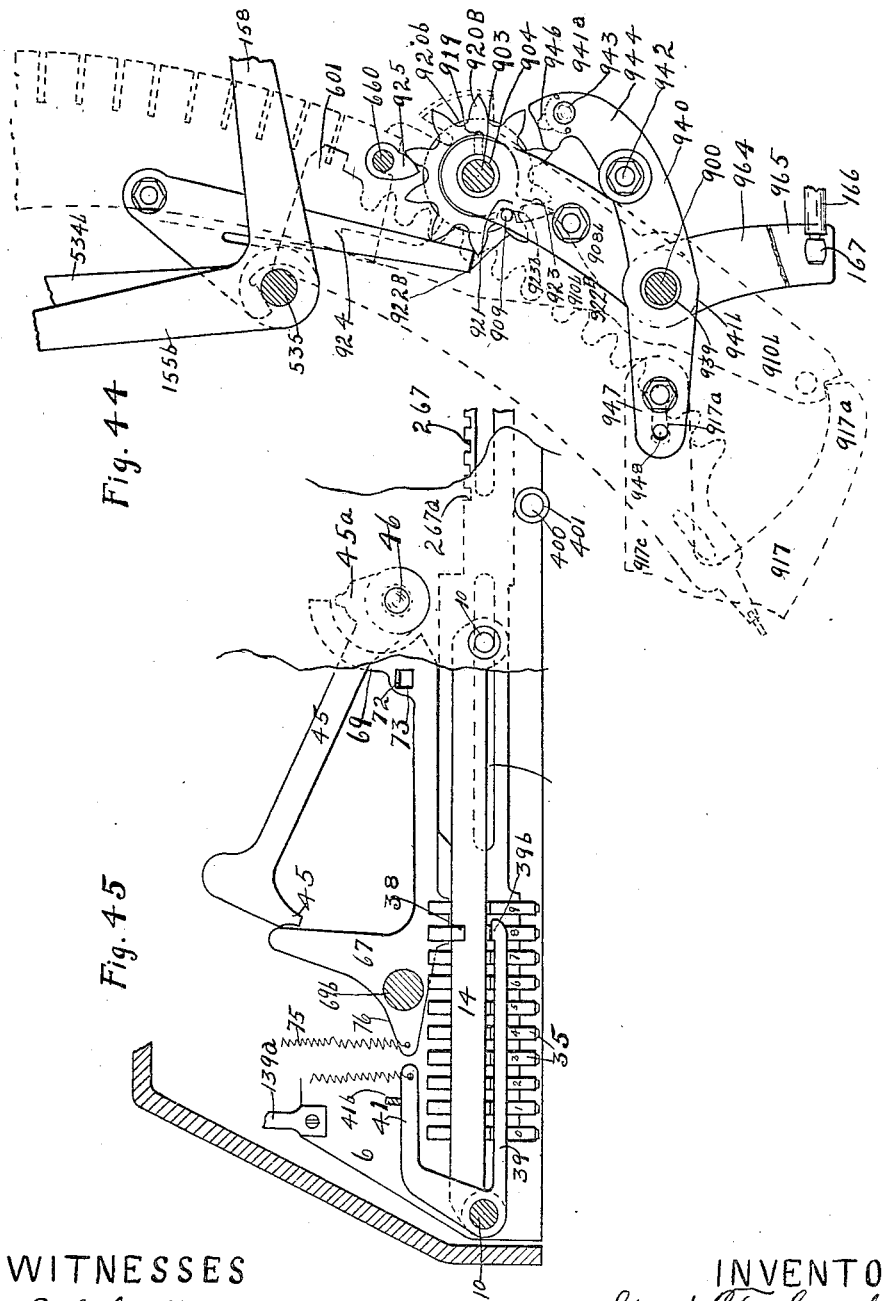
WITNESSES
R. C. Griffin
A. H. Kephart
INVENTOR
Stuart F. Smith
BY
Carlos P. Griffin
ATTORNEY

S. F. SMITH.
COMPUTING AND RECORDING MACHINE.
APPLICATION FILED AUG. 15, 1911.

1,278,049.

Patented Sept. 3, 1918.
12 SHEETS—SHEET 12.

INVENTOR
STUART F. SMITH

UNITED STATES PATENT OFFICE.

STUART F. SMITH, OF SAN FRANCISCO, CALIFORNIA.

COMPUTING AND RECORDING MACHINE.

1,278,049.　　　　　　　Specification of Letters Patent.　　Patented Sept. 3, 1918.

Application filed August 15, 1911. Serial No. 644,142.

*To all whom it may concern:*

Be it known that I, STUART F. SMITH, a citizen of the United States, residing at San Francisco, in the county of San Francisco and State of California, have invented new and useful Improvements in Computing and Recording Machines, of which the following is a specification.

My invention relates to what are commonly known as adding machines, and more especially to that type thereof which are capable not only of adding or accumulating, but also of printing or listing, a series of items or amounts, and of printing a total thereof, such as the well known Burroughs adding and listing machine, constructed under and in substantial accordance with Letters Patent of the United States Nos. 504,963 and 505,078, issued upon the application of William S. Burroughs on September 12, 1893, and No. 823,474, issued upon the application of Alvan Macauley on June 12, 1906.

The Burroughs machine, constructed under and in accordance with the above-mentioned patents, and other similar machines now upon the market, are capable of, and are regularly employed for, listing and accumulating individual items or amounts and printing totals or sub-totals thereof when desired.

The object of this invention is to provide an adding machine of this general type or character with improved means, so that the machine can be used not only for the purposes as outlined above, but also, at the discretion of the operator, for making duplicate entries, the total of all said duplicate entries being registered in a separate accumulator. Moreover, I provide means by which this invention can be used for printing entries in a book or on a voucher, of an adjustable and movable carriage adapted to hold said book or voucher, and carrying said book or voucher to a hidden printing position, and means by which all accumulations of amounts entered in said books or on said vouchers are locked against any change on the part of the operator or other person not authorized to change said accumulator, except to add thereto.

I have illustrated my invention as embodied in the well known Burroughs machine, and I have provided novel and efficient mechanism for equipping such a machine for the various sorts of work referred to, without interfering with its normal and familiar operation and use; but my invention is not limited in its application or scope to the Burroughs machine, but may be embodied in other machines of the same general class for the same purposes and with the same results.

In the accompanying drawings, Fig. 1 is a broken front view of the machine, the lower portion of the casing being broken away; Fig. 2 is a side view on a reduced scale, a side of the casing being removed; Fig. 3 is a horizontal section of the machine, showing in plan view the mechanism which, in my invention, is attached to the Burroughs machine; Fig. 4 is a side view similar to Fig. 2, of the machine viewed from the opposite side; Fig. 5 is a side view of the machine, the casing being shown in section, and certain parts which are shown in Fig. 2 being omitted; Fig. 6 is a front view of the machine, certain parts of the casing and mechanism being omitted; Fig. 7 is a plan view of the parts shown in Fig. 6; Fig. 8 is a full-sized detail view, showing more particularly certain shifting mechanism; Fig. 9 is a side view of the same; Fig. 10 is a detail rear view of the same; Fig. 11 is a detail front view on a greatly reduced scale of the machine as a whole; Fig. 12 is a side view thereof on the same scale; Fig. 13 is a broken plan view, partly in section, on the line 13—13 of Fig. 15 of the casing for my attachment to the Burroughs machine; Fig. 14 is a side view, partly in longitudinal section, of the same; Fig. 15 is a front view, partly in section on the line 15—15 of Fig. 13; Fig. 16 is a detail perspective view of the type shifter bar; Fig. 17 is a similar view of another type shifter bar; Fig. 18 is a detail perspective view of a trigger arm; Fig. 19 is a similar view of a hammer; Fig. 20 is a similar view of a type controller arm; Fig. 21 is a perspective view of a guide rod; Fig. 22 is a similar view of a type-supporting bar; Fig. 23 is a similar view of a type bar; Fig. 24 is a view similar to Fig. 6, certain parts, however, being omitted, and other parts shown being in their other position; Fig. 25 is a side view of a key in its depressed position; Fig. 26 is a similar view of the key in its elevated position; Fig. 27 is a perspective view of a spacer for the type shifter bars; Fig. 28 is a plan view of the supporting plate; Fig. 29 is a transverse section thereof; Fig. 30 is a plan view of the platen; Fig. 31 is a section thereof; Fig. 32 is a plan view of the slide plate; Fig. 33 is a transverse view thereof; Fig. 34 is a transverse section of the parts shown in Figs. 28, 30 and 32 assembled; Fig. 35 is a plan view of a transverse controlling bar; Fig. 36 is a sectional view of a button on the end of said bar; Fig. 37 is a plan view of a slide bar; Fig. 38 is a front view of a head; Fig. 39 is a front view of a spacing bar; Fig. 40 is a side view of a lever; Fig. 41 is an edge view of the same; Fig. 42 is an edge view of another lever; Fig. 43 is a detail view of a controlling bar.

Fig. 44 is a side elevation partly in section of the accumulator wheels showing the position occupied by the highest accumulator wheel when about to be stopped to prevent the machine from clearing the zero.

Fig. 45 is a side elevation partly in section of the pass book type bars and showing the striking hammer just ready to strike the numeral 8.

Figure 1:
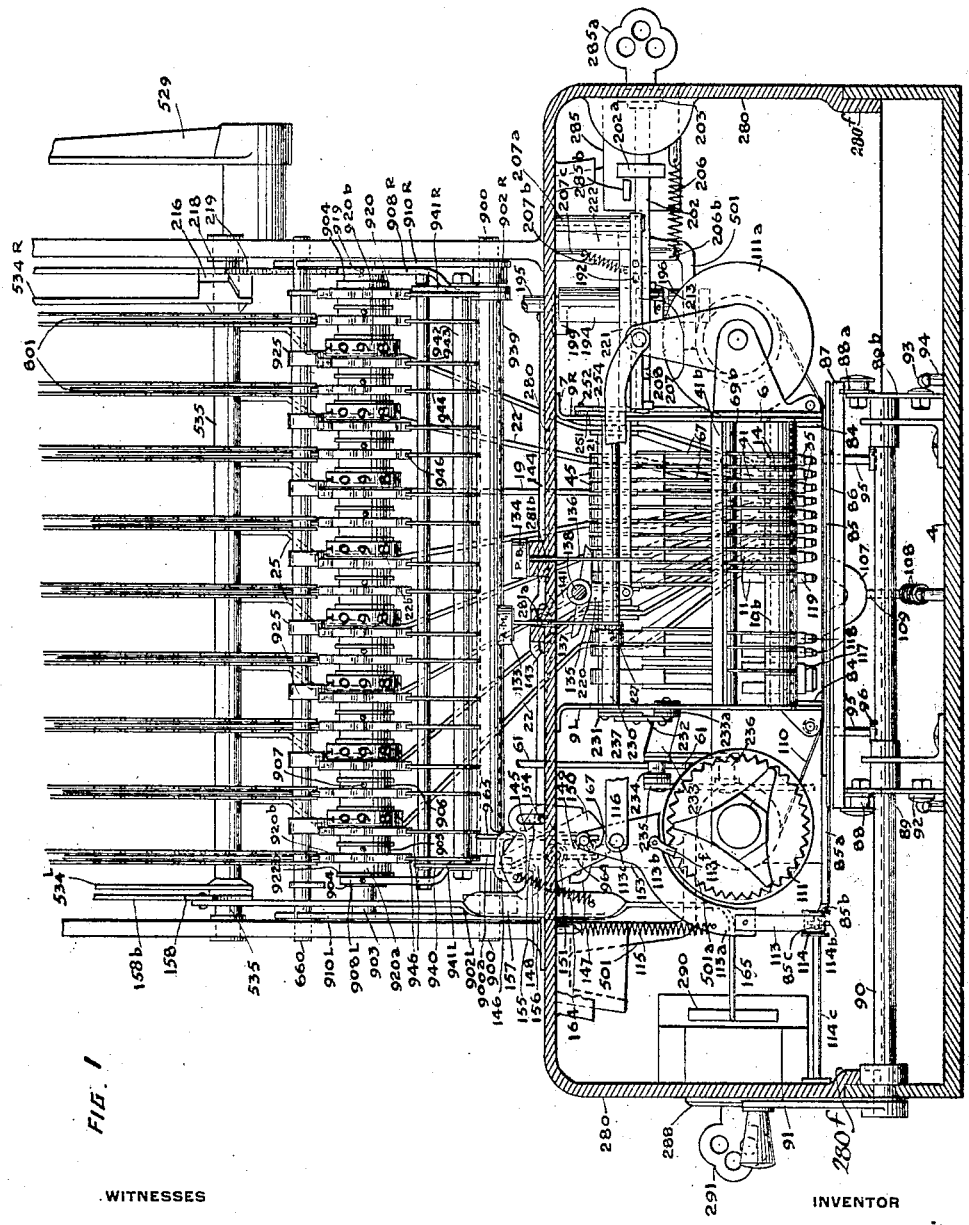

The Burroughs adding and listing machine is well known through extensive commercial use and through various patents thereon; nevertheless it will greatly assist in explaining the present invention to enumerate many familiar parts of such machine, before proceeding to a description of the new parts employed for carrying out the present invention.

As is well known the Burroughs machine is provided with a key-board having a series of keys 528 (Fig. 2) arranged in rows representing the different denominations, increasing from right to left, of figures to be added and the keys of each row representing the digits 1 to 9. These keys are arranged to control or operate a series of stop wires or rods 530, and thus to determine the extent of movement, or descent, of a series of sectors or racks 601, corresponding in number with the rows of keys, it being understood that, in the operation of the machine, a rack, corresponding to a row of keys in which one of the keys has been operated, is permitted to descend a distance corresponding in magnitude with the numeral of the particular key operated or depressed. Furthermore, in a Burroughs machine each rack is provided with a retainer 602 which is operated by a sliding bar 531 corresponding in number to the rows of keys and moved rearwardly whenever a key in that row is depressed, and these racks are normally locked in their raised position, and remain in such condition, until their retainers or locks 602 are removed from locking engagement therewith.

From each sliding bar 531 there is dependent at its forward end a projection 532, which, upon the rearward movement of said bar, engages a transverse rod 533, said transverse rod being securely fastened at either end to the forward upper part of bent arms 534R and 534L (Fig. 1), which rock with a shaft 535, the lower ends of said arms being rigidly fastened to said rock shafts 535, and said shaft having bearings at its ends in the upper portions of the side frames of the machine.

The transverse rod 533 and the arms 534R and 534L are rigidly connected, and act as a frame, and are held in a forward position by a tension spring 536 (see Fig. 4) fastened at its rear end to the arm 534R, and its forward end to the frame of the machine. The arm 534L is divided at its upper end in two forwardly projecting arms, to the lower one of which is attached said rod 533. When any one of the keys 528 is depressed and the sliding bar 531 thereby moved rearwardly, the projection 532 engages the transverse rod 533, drawing said rod and arms 534R and 534L to a rearward position. These are held in this position (unless the correction key to be referred to later is actuated) until a handle 529 (Fig. 1) has been actuated and is about to return to its normal position. The train of mechanism necessary to bring about this result is well known and has been shown in former patents and is not necessary to be explained here, it being understood that each sliding bar 531 has a latch at its rear end so adjusted that said sliding bar is held in its rearward position by said latch upon the depression of any key in the column pertaining to said sliding bar, and it being further understood that no other key in said column can be depressed when said sliding bar is thus held, and that the key depressed and its sliding bar are held in this locked position until the handle 529 has been actuated and has almost completed its return stroke, when the latch is released, releasing said bar and key, both returning to their normal position and at the same time releasing the transverse rod 533.

On the left-hand lower corner of the key-board of the machine is a total key 550, (Fig. 2) which is attached to an upstanding arm 551a of a bell-crank lever 551, pivoted at 552. At the forward end of the arm 551a of bell-crank lever 551 is riveted a pin 553 projecting inwardly. When the arms 534L and 534R are moved rearwardly, as mentioned above, the top portion of arm 534L moves under the pin 553, thereby preventing the depression of the total key 550 and the operation of said total mechanism. The object of this construction is to prevent the depression of the total key when any one of the keys 528 has been depressed.

When the total key 550 has been depressed, lowering the upper arm of bell crank lever 551, the inwardly projecting pin 553 on said arm passes downward, and to the rear of the upper rear side of arm 534L, locking this arm against a rearward rocking movement and thereby locking all of said numeral keys, so that they cannot then be depressed.

As is well known, this machine has suitable latching means by which each slide bar 531, numeral keys 528 and total key 550 are automatically locked when the handle 529 is actuated, said locking means being released upon the return stroke of said handle. Also, in the well known construction of this machine, there is located on the right hand side of the key-board thereof a key 560 (Figs. 11, 12,) by the depression of which key any depressed numeral key is released and resumes its normal position. It is to be understood that the Burroughs machine to which this invention is applied has such latching means above referred to, automatically locking and releasing said keys, and such correction key 560.

The racks 601 are carried at the forward end of a series of main levers or sector bars 603 (Fig. 2) loosely hung upon a central cross shaft 600, said levers 603 being extended in rear thereof and carrying at their rear ends, arranged in arcuate form, series of type plates 618, bearing type for printing numbers from 0 to 9. When the operating handle of the machine is drawn forward, a frame 613 carried by the shaft 600 is lowered, and those racks 601, which are associated with any banks of amount keys in which keys have been depressed, follow the said frame until arrested by the stops set by the depressed keys. The corresponding upward movement of the rear ends of the levers move into position, opposite a platen 990, type for the printing of the amount represented by the depressed keys. As the handle reaches the end of its forward stroke the printing is effected by the percussive action of pivoted hammers 715, the latter being driven rearward by drivers 716 under the impulse of springs 780. A bail composed of side pieces 712 and a cross-rod 757 normally engages the hammer drivers, but, as the operating handle is drawn forward, this bail is lifted, through the medium of a link 820 connecting the bail with a crank plate 814 on a rock-shaft 800. The hammer drivers are, however, restrained by latches 717, and are not released until the operating handle is about at the end of its forward stroke. The latches 717 are controlled by pawls 718 carried by a swinging frame 700 and controlled by the levers 603 through engagement of the tails of said pawls with inclined shoulders on said levers. Thus when no key in a bank is depressed, and consequently no movement of the corresponding lever 603 takes place, the pawl associated with that lever will be raised above the notch of the associated latch, and will not lift the same as the frame 700 swings forward. On the other hand, when the lever 603 is moved by reason of the depression of a key in the corresponding bank, the associated pawl 718 is not so displaced, but, as the frame 700 swings forward, will lift the associated latch. Each latch 717, except the extreme left hand one, is overlapped at its forward end by a laterally turned tail of the latch next to the left, so that when any latch, except the extreme right-hand one, is lifted by its pawl 718, all the latches to the right will be lifted, whether or not levers 603 corresponding with all such latches have been moved. In this way the filling in of ciphers is provided for in decimal places where no digits occur.

The racks 601 coöperate with pinions 920 (Figs. 1, 4, 5, 8, 9) strung along a cross-rod or shaft 903, which is carried between side-plates 910L and 910R, these side-plates, together with suitable tie-pieces and intermediate plates, making up a frame, (Figs. 8, 9,) which rocks upon a shaft 900 for the purpose of engaging the pinions with, and disengaging them from, the racks. In an ordinary operation of the machine for adding an item or amount, these pinions remain out of mesh with the racks during the forward stroke of the operating handle and the consequent downward swing of the racks. Then, as the handle starts rearwardly, the pinions are brought into mesh with the racks so as to partake of their movements in returning to normal. In the operation of taking a total, the pinions remain in mesh with the racks during the forward stroke of the operating handle so that the downward swing of the racks will turn the pinions backward until they reach zero positions. Then, if the pinions are to remain at zero, they are disengaged from the racks, so that the latter may return to normal without affecting the pinions. If, on the other hand, a sub-total is desired the pinions remain in mesh with the racks throughout the operation, so that, having been turned backward to zero, and the total printed, they will be again turned forward so as to display the same accumulation as before being turned backward.

The customary means for controlling the rocking of the accumulator frame comprises a pitman 914 (Fig. 2) formed or branched at its forward end to engage studs 958 and 958a on the rocking frame, a three-armed plate or lever 913 rocking upon a suitable stud and having its depending arm jointed to said pitman, and an arm of a rocking-lever 813 carried by a rock-shaft 800 and having pivoted to its upper end a spring-held wipe-plate or pawl 821 for coöperating with studs 961 and 961a on the oppositely extending arms of the plate or lever 913. The pitman 914 is connected by a link 911 with bell crank lever 551 drawn forward and upward by a spring 554, which thus serves to engage a notch of the upper branch of the pitman with the stud 958a. This is the normal condition which provides for the pinions 920 being moved out of mesh with the racks at the outset of an operation and into mesh therewith as the handle starts rearward. The bell crank lever 551, as previously explained, has an upstanding arm at its forward end surmounted by a key 550, (Fig. 2) which is ordinarily termed the total key, and whose depression results in disengaging the pitman from the stud 958a and bringing a hook of the lower branch of said pitman to rest upon the lower stud 958. The link 911 and bell-crank 551 have a slot-and-pin connection, so that, when the total key has been depressed, and the handle is drawn forward, the resultant forward thrust of the pitman will cause the latter's hook to drop by gravity over the stud 958. Then, if the key is held down while the handle returns to normal, this hook, acting against the stud 958, will rock the accumulator frame and disengage the pinions from the racks. If, on the other hand, the key is released and allowed to rise before the handle starts on its rearward stroke, the pitman will be lifted and its hook carried above said stud, so that the pinions will remain engaged with the racks and consequently will be turned forward to restore the accumulation.

The lock frame 940 to lock the pinions 920 is pivoted upon the shaft 900, its locking dogs 946 engaging the teeth of the pinions 920 when the latter are disengaged from the racks 601 and thrown forward and downward as previously explained, thereby preventing any accidental turning of said pinions.

The rear arm 813a of the lever 813 carried on a rock shaft 800 is pivoted to the casing of the dash pot 815. When the handle 529 is actuated the rock shaft 800 is rocked in the direction of the arrow by a train of mechanism well known and not necessary to be explained here, and said dash pot 815 is drawn downwardly upon its piston 816, the action of said dash pot being to govern the speed and regulate the movements of the various mechanisms outlined above by the flow of oil contained in said dash-pot 815 through valves, the full description of said dash pot and valves having been previously shown in drawings and patents on file.

Under the construction and arrangement of parts heretofore employed in the Burroughs machine the inking-ribbon has been located and arranged and operated, as shown in Fig. 1 of the Burroughs Patent No. 504,963, that is to say, it has been wound upon a spool mounted upon a horizontal axis in the extreme upper and rear portion of the machine, and thence led rearward and downward in a vertical direction over suitable guides between the platen-roller and printing-types, and thence forward around a second spool located upon another horizontal axis in the extreme upper and rear portion of the machine, and thence led rearward and downward in a vertical direction over suitable guides between the platen-roller and printing-types, and thence forward around a second spool located upon another horizontal axis in the lower part of the rear end of the machine, the ribbon thus moving in a vertical direction between the platen and type, and being of sufficient width to cover the entire group of type-carrying levers.

I will now describe my invention and its attachments to the Burroughs machine.

Figure 2:
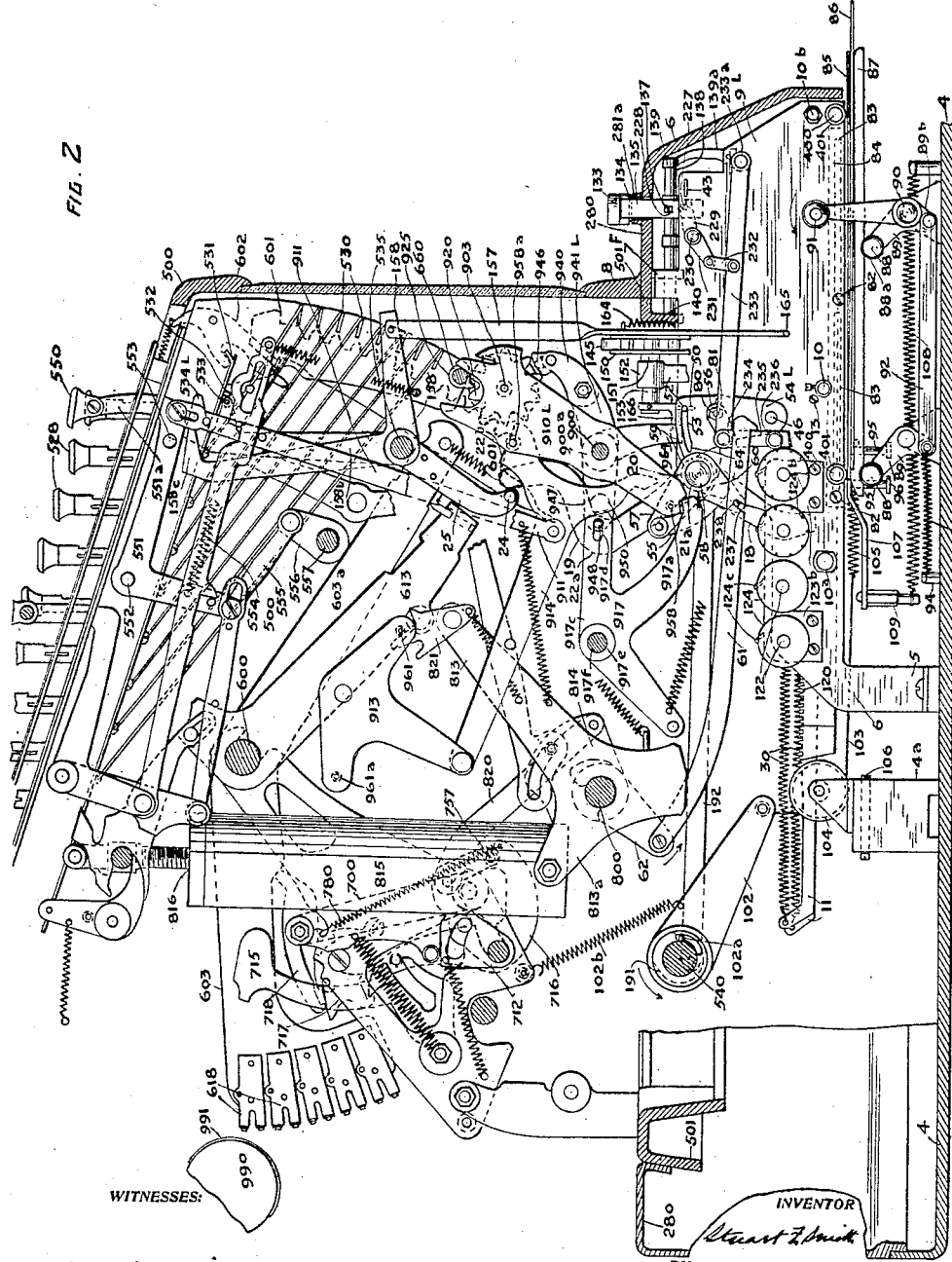

500 indicates the mechanism of the Burroughs adding machine mounted upon the usual base 501. The bottom part 501a (see Figs. 5 and 6) of said base has been partially removed as shown in Fig. 2; to allow for the connection of the mechanism of my invention with the Burroughs machine.

Secured to said base in any suitable manner, as by hangers 3, is a base plate 4, upon which is secured, as shown at 5, the rear end of the entry frame 6, the front end of said frame being secured, as shown at 7, to the front bar 501F of the base 501. Said entry frame comprises side plates 9L and 9R connected together, and spaced at their proper distances by suitable transverse bars and plates, and has at the forward end an overhanging portion in which, as hereinafter explained, the pass book carriage reciprocates. Rigidly connected to said side plates 9L and 9R are transverse rods 10 and 10a (see Figs. 2 and 4) upon which can travel type shifter bars 11. Said type shifter bars are spaced from each other in their rear portions by being received within notches formed on the upper side of the bar 10a and at their front ends by means of pins 12 extending upwardly from a transverse bar 13 (see Figs. 4 and 39,) secured to the inner sides of plates 9L and 9R. The front ends of the type shifter bar 11 are also spaced from each other by thin type supporting bars 14, hereinafter more particularly described.

Each type shifter bar 11 is formed on one side thereof, the left hand side as herein shown, with a vertical groove 15 (see Fig. 16) of which the front side 16 is straight and vertical and the rear side 16a is angular and is formed with a forwardly extending shoulder 17, slightly above the middle thereof. Into said vertical groove 15 depends an arm 18 of a bell crank lever 19 having a suitable hub 20 pivoted upon a sleeve 21 on a shaft 21a extending between said side plates. The upper arm 22 of said lever is formed with an acute bend 22a to the rear to avoid a shaft 950, which is part of the mechanism of the Burroughs adding machine, then forwardly and then, at its extreme upper end 22b, straight and almost perpendicular with the center of shaft 21a when at rest. The upper arms 22 (see Fig. 1) of the five levers on the left are also bent laterally or outwardly to the left, then upwardly and those of the two levers on the right, to the right, and then upwardly, so that the upper ends of all the levers are substantially in planes between the respective columns of keys of the Burroughs machine, and capable of rocking in lines parallel to said columns. The lower ends of levers 19 are bent inwardly from their bearings on sleeve 21, then downwardly, so that the arms 18 at their extreme lower parts mesh with the vertical grooves 15 and are capable of rocking along lines parallel to said type shifter bars.

Each upper end is normally held in an upright position by means of a stud 24 extending laterally from an outwardly bent arm 25 attached to and dependent from the forward arm 603a of sector bar or lever 603.

To the rear end of each type shifter bar is attached a spring 30 (see Fig. 4), the front end being secured to transverse bar 31 of the frame 6, said spring being normally in tension. By the tension of this spring the rear side of the upper arm 22 of the lever 19 is yieldingly held against its stud 24, because of the forward pressure of the shoulder 17 of type shifter bar 11 against the lower arm 18 of lever 19. When said arm 603a of lever 603 swings downward and rearwardly, the tension of the spring 30 yieldingly holds the arm 22 of the lever 19 against said stud, and the type shifter bar moves forward a distance dependent upon movement of said lever 603. Upon the key in said column which has thus been depressed depends the distance through which the arm 603a of lever 603 descends and therefore also the distance through which the type shifter bar 11 moves.

When the handle 529 returns to its normal position the frame 613 of the Burroughs machine, which at the forward movement of said handle swung downward and rearwardly, now forces upwardly the depressed arm 603a of lever 603, thereby moving the type shifter bar 11 into its initial position.

In the drawings filed herewith and more particularly in Fig. 1 thereof, it will be seen that the Burroughs machine shown herein is composed of a series of nine sector bars, racks and other parts of the Burroughs machine which are of the normal construction, except that the numeral keys of the ninth column from the right have been detached, leaving only eight columns of keys. My attachment, as shown in the drawings, has, as will be seen, a series of eight type shifter-bars and their connections with the eight levers 603, beginning on the right hand side of the machine. This method of construction is not essential, as of course there can be as many series of type shifter bars as there are sector bars and columns of keys in and on the adding machine, and the construction shown does not limit my invention to any certain number of series of shifter bars, and the like.

Figure 46:
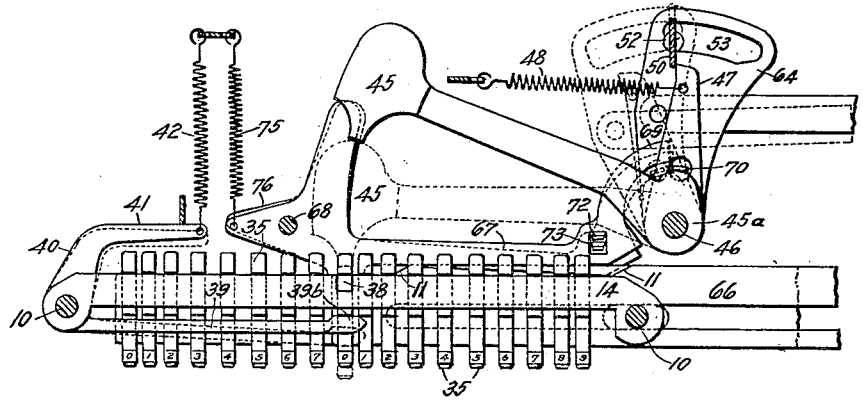
Fig. 46 is a detail in side elevation and on a slightly larger scale to show the position occupied by the type bars when the numeral is to be struck.
Figure 47:
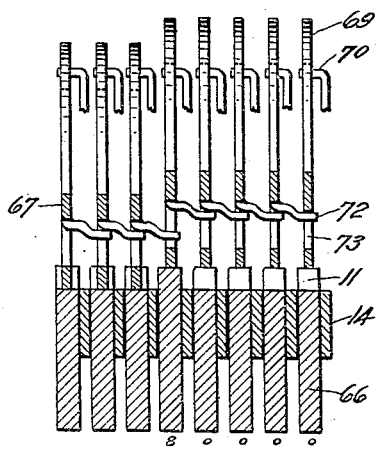
Fig. 47 is a sectional view through the type bars showing the positions they occupy when a figure is to be struck by the last one of the set and zeros to be struck by all of those bars at the right of the numeral 8 below one of them.

Said type shifter bar is formed, preferably on the other side thereof to the vertical groove 15, and herein shown on the right hand side and at its forward end, with ten vertical grooves 34 (see Figs. 16 and 3) in which can slide vertical type bars 35, there being ten type bars for each type shifter bar, each having a type face formed on its lower end thereof capable of printing one of the figures 0 to 9, the forward type bar being for the figure 0, and the others in succession for the figures 1 to 9. Said type bars are normally upheld in said grooves by means of the type supporting bars 14, which alternate with the type shifter bars, and are preferably on the right hand side thereof and are supported at their forward ends on the transverse bar 10b and at their rear ends to the transverse rod 10. Said type bar 35 is formed on its right hand side with two horizontal grooves 36, 37, (see Fig. 23) the upper groove 36 receiving the corresponding type-supporting bar, so that said type bars are thus normally prevented dropping in the grooves 34 in the type shifter bars, since the type-supporting bar abuts against the upper ends of said grooves. Each of the type-supporting bars is formed with a groove or notch 38 (see Figs. 4 and 46) in its upper edge vertically above the printing position, so that, at the end of the forward movement of the corresponding type shifter bar, the type bar corresponding to the key which has been actuated is brought into vertical register with said notch 38. The type bar would thereupon be able to drop in its groove 34 in the type shifter bar, but this is prevented, until it is actuated by the hammer as hereinafter described, by means of a controller arm 39 (see Figs. 4 and 20) of a lever 40 pivoted upon the transverse bar 10B, and having an upper arm 41, the end of which is connected to a coiled spring 42, the other end of said spring being attached to a bar 43 extending transversely of the frame 6. The free end of said controller arm 39, which is bent slightly to the left at 39a, so that the forward end is directly under the type supporting bar, enters the lower horizontal groove 37 in the type bar and prevents it dropping into the notch 38 in the supporting bar until actuated by the hammer 45 hereinafter described. The rear end of controller arm 39 has a slightly raised cam surface 39b on which the upper edge of groove 37 of type bars rests when at printing position or notch 38. Type bars passing the notch 38 ride on this elevated cam surface 39b until the upper edge of groove 36 again engages the top of type supporting bar 14.

To adjust the position of the controller arms 39 I have placed a transverse bar 41b above the upper arms 41 and at right angles thereto. The tension of springs 42 holds the arm 41 yieldingly against said transverse bar 41b thereby keeping the cam surface 39b in proper position relative to type bars 35.

It will thus be seen that, by the depression of the keys in the several columns of the Burroughs adding machine, the respective type shifter bars are moved to the corresponding positions and the type bars shifted thereby are brought into vertical relation with the hammers hereinafter described, all the type bars, except those in proper printing position, being supported against downward movement, and the type bars in the printing position being ready to be depressed against the tension of said springs 42 by the depression of the respective hammers.

The springs and other mechanisms which operate the hammers 45 and 715 always cause said hammers to strike the type with substantially the same blow, thus effecting a substantially uniform printing impression each time the machine is operated. This effect cannot be obtained where the force of the blow on the type is dependent on hand operation thereof.

The respective type bars which have thus been brought into printing position are adapted to be actuated by hammers 45 (see Figs. 4 and 19) pivoted loosely at their rear ends upon a transverse rock shaft 46 pivoted in the plates 9L and 9R, said hammers having upwardly projecting arms 47, to the upper ends of which are attached the rear ends of springs 48, the front ends of which are attached to a transverse stationary bar 49 secured to the frame 6. Said hammers are normally prevented from dropping by the engagement with said arms 47 of a transverse stop plate 50 movable vertically in vertical recesses 51 in the side plates 9L and 9R of the frame 6, said stop plate having rounded ends 52 extending beyond said side plates and engaging in cam slots 53 of rocking cam plates 54L and 54R secured to the transverse rock shaft 46. Said rock shaft is rocked by means of a link 55 (see Figs. 2 and 5) attached, as shown at 56, to the cam plate 54L and connected to an arm 57 of a bell crank lever pivoted at 58 upon a sleeve 59 on the shaft 21a, the other arm 60 of said lever being connected with a link 61, the other end of which is adjustably connected with a rocking lever 62 which is rigidly fastened to the shaft 800, a part of the Burroughs adding machine, and adapted to be actuated in unison with the dash-pot 815 previously described and with the other mechanism, the movement of which is governed by said dash pot.

Upon the forward movement of the handle 529, said lever 62 rocks in the direction of the arrow (see Fig. 2), by the rocking of shaft 800 said cam plates 54L and 54R are rocked, and the cam slots 53 are caused to travel on the projecting ends 52 of the stop plate until the rear ends of said cam slots 53 arrive at said projecting ends. Said rear ends of the cam slots are formed with inclines 64 (see Fig. 5), which, when said rear ends arrive at said projecting ends, have the effect of raising the stop plate in its vertical bearings, and thus permitting the arms 47 of the hammers to move forward. When the stop plate is raised, all the hammers, except those which are restrained by the trigger arms hereinafter described, fall upon the type bars, and cause said type bars to drop against the pressure of the springs 42 holding the type controller arms 39, forcing said type faces on said type bars against the ribbon 110 to be described later, and thereby effecting the printing on the paper beneath said ribbon.

The type shifter bars 11 are formed, at a short distance behind the vertical grooves for the type bars, each with a raised cam portion 66 (see Fig. 16), and said cam portions, when the type bars move forward by the mechanism previously explained, they engage the upwardly inclined under sides of trigger arms 67 (see Fig. 4) pivoted at 68 on the transverse shaft 69b, secured at either end to plates 9R and 9L. Each trigger arm has an upwardly curved rear portion ending in a trigger 69, which normally abuts against a lip 70 (see Fig. 4) extending laterally from the rear portion of arm 45a of the corresponding hammer, and normally prevents the downward movement of said hammer, but when the type bar corresponding to a column in which keys have been depressed moves forward, said trigger arm is elevated from said lip and permits the corresponding hammer to drop when later released by the stop plate as previously explained. Springs 75 attached to forward arms 76 of said trigger arms and at their upper ends to plate 43 return the trigger arms to their normal position when the type shifter bars are withdrawn.

The two cam plates 54L and 54R are connected by a transverse rod 80 (see Fig. 4) passing through slots 81 in the side plates 9L and 9R, and upon one projecting end of said rod is secured one end of the link 55 which actuates the cam plates 54. The slots 81 permit movement of the rod 80 with the cam plates, in front of the front edges of the arms 47 of the hammers which are actuated, and upon the return of the cam plates, said rod 80 moves rearwardly with said cam plates, and restores to their normal positions all of said hammers which have been so operated. When the hammers have been so returned the triggers are likewise restored to their normal position by the actuation of said springs 75, as explained.

Also when the arms 47 of the hammers have been returned to their normal position by said rod 80, the stop plate 50 drops in its vertical bearings, locking the hammers until the next operation of the handle 529.

Each trigger lever is formed at its rear end thereof with a lip 72 extending laterally to the right and entering a hole 73 formed in the next trigger lever to the right. Consequently when any trigger lever is raised by the action of the cam portion of the type shifting bar, all the trigger levers to the right are also raised. The trigger levers to the left, however, are not so raised because the hole in each trigger lever is sufficiently deep that the trigger lever can be raised without the bottom of the hole engaging the lip of the lever to the left and so raising said trigger lever. In the Burroughs adding machine, all the sectors or levers 603 are arranged to be moved, in each operation of the machine, a short distance, which movement brings the zero type of said levers or sectors into printing position.

In most recording devices used in machines of this general character, the printing is effected on paper usually held on a cylindrical platen. My arrangement of a type shifting bar with its various type bars, said type bars being supported by a type carrying bar, and said type-shifting bar having a groove or slot at the printing position, and the further arrangement of a controller arm and a single spring returning said type bars to normal position after being actuated, make it possible to use this apparatus to make impressions on a plane platen without the necessity of having a separate spring on each type bar, something that would be mechanically difficult to accomplish when working on such close centers as are necessary in an apparatus of this character.

The connection is such that the type shifter bars are all likewise moved so as to bring the zero type into printing position. However, it will be seen that this movement is not sufficient to cause the raised cam 66 (see Fig. 4) on the type shifter bar to engage and raise the trigger arm 67 as this cam is placed on the type shifter bars so as to engage and raise the trigger arm 67 only when said type shifter bar moves beyond the zero position. Therefore, if only the numeral key 528 representing 9 in the fourth column from the right hand side of the machine is depressed, and the handle 529 actuated, the type bar representing 9 in the fourth shifter bar from the right will print 9 and each type bar at the right will print zero, viz. 9000. The type bars at printing position on the left will not print, although each is at zero, because the trigger arms have not been moved from their normal position.

Extending inwardly from the side plates 9L and 9R of the frame 6 are two pairs of pins 82 which enter slots 83 in guide rods 84, to the lower edges of which guide rods is secured a slide plate 85, extending laterally beyond the frame 6, said plate being thus adapted to slide a limited distance along the base of said frame. Fastened to the sides of side plates 9L and 9R and extending outwardly are two pairs of pins 400 on which revolves two pairs of wheels 401. These wheels are so adjusted that the slide plate presses against and slides on said wheels, as hereinafter described. Attached rigidly at its rear end to said slide plate is a platen plate 86 (see Figs. 4, 30 and 34), which is preferably made of thin steel the forward end and sides being rounded and the plate being much narrower than said slide plate 85. Said platen plate, being unsupported at its front portion, except as hereinafter described, can drop from said slide plate 85 a sufficient distance to permit a sheet of paper to pass therebetween. Beneath the platen plate 86 is a supporting plate 87, loosely attached to the slide plate 85 by guide rods 95 rigidly fixed to said slide plate and depending from the rear end thereof, said guide rods passing through holes in the supporting plate 87. Said supporting plate is supported by wheels 88a of studs 88, projecting laterally from the upper arms 89 of two pairs of bell crank levers, 89B, said bell crank levers being rigidly mounted upon transverse shafts 90, one of said shafts being extended and provided with a handle 91 for operating the same. The other arms of said bell crank levers are connected by links 92 to which are attached springs 93, said springs being also connected to studs 94 upon the base plate 4. Said bell crank levers being all of the same size, the supporting plate can have a directly vertical movement, said movement being guided by the guide rods 95 depending from the side plate 85 and having heads 96 limiting the downward movement of the supporting plate 87. When the handle 91 is pressed in the direction of the arrow, the four studs 88 simultaneously swing downward all in the same direction and allowing the supporting plate to correspondingly drop. The platen plate, being connected at its rear end only to slide plate 85, drops part way at its forward end. The slide plate supporting these suspended parts now rests on the pins 82, attached to the plates 9L and 9R in slots 83 of guide rods 84 attached rigidly to the said slide plate. Upon releasing the handle 91, the tension of the springs 93 forces the supporting plate, the platen plate and slide plate together and presses the slide plate against the wheels 401 attached to side plates 9L and 9R of frame 6.

The slide plate 85 is formed at its forward end thereof with a transversely extending slot 97, to expose to the printing action of the type the paper 86D (see Fig. 5) which is inserted beneath the slide plate and on the platen. On the platen beneath the slot 97 is inserted a piece of rubber $86^1$ or a yielding material, to receive the impact of the printing type.

The present device is intended especially, although not exclusively, for the printing in a pass book of the amounts of deposits, thus dispensing with the necessity of entering said deposits by handwriting, and also providing, as hereinafter described, a mechanism for preserving a record of said deposits.

The supporting plate 87 itself is adapted to support the pass book, which is inserted between the supporting plate and platen, while the sheet which is to be printed upon is inserted between the platen 86 and the slide plate 85, said platen being of such width that when inserted beneath a sheet of the pass book on either side, the slot 97 will be in such position that the printing of the amount of the deposit will be done in the column usually provided for the entry of the said amount (see Figs. 1 and 28 to 34).

Two thin strips of metal 97a, securely fastened across the slot 97 and at right angles thereto, serve as register points, so the paper or leaf of a book can be inserted correctly to receive the printed impression at the right place. The mechanism just above described for lowering the supporting plate permits of easily inserting the pass book, so that the printing may be effected upon the paper in the proper position immediately below the previous records of deposits, and, upon releasing said mechanism, the spring 93 raises the supporting plate, so that the book is then clamped and held in said position. I term the slide-plate 85, the platen plate 86 and supporting plate 87, the pass book carriage, since, as will hereinafter be described, these parts have a common reciprocating motion.

The particular construction of the slide-plate 85, the platen plate 86 and the supporting plate 87 is very important, as thereby one leaf of a pass book can be held between the platen plate and the slide plate while the balance of said book is clamped between the supporting plate and the platen plate, thereby giving a uniform surface upon which to print.

Secured to a shaft 540 of the Burroughs adding machine which is actuated simultaneously with the movement of the handle 529 of said machine and not through the interposition of the dash pot, is a crank arm 102, to the end of which is attached a steel tape 103, which passes around a pulley 104 having bearings supported upon the base plate 4, the front end of which tape is attached to a spring 105 secured at its front end to the slide plate. Therefore the rearward movement of said slide plate together with other parts of said pass book carriage commences with the movement of the handle 529, as shaft 540 rotates in the direction of the arrow upon the forward movement of said handle. Said slide plate arrives at the proper position for printing, before the handle 529 has reached the end of its movement, and before the inclines 64 in the cam slots 53 have acted upon the projecting ends of the stop plate 50 to raise the same and release the hammers, and further rearward movement of said slide plate is prevented by the rearwardly extending arm 107 secured to said slide plate, abutting against the end of an adjustment screw 106 (see Fig. 4) secured in block 4a fastened to base 4. The further movement of the handle 529, during which movement the said hammers are released, through the tension on said tape expands said spring 105. By turning the adjustment screw 106 the limit of the rearward movement of said slide plate can be adjusted to exact printing position.

It is to permit of said slide plate being at rest at the printing position when the hammers are released that I provide the spring 105. When the rearward movement of the slide-plate has ceased, owing to its having engaged the stop screw 106, as before explained, said spring is expanded by the further movement of the handle. The release of said hammers has been timed to be accomplished after said arm 107 abuts against the stop screw 106.

The slide plate is returned to its normal position, forwardly of the machine, upon the return stroke of the handle 529, by means of a spring 108 attached at its rear end to a stem 109 depending from said extension 107 and at its front end to the base plate 4.

The printing ribbon 110 (Figs. 1, 5, and 7) which extends under the forward end of frame 6 above the slide plate 85 and below the printing line of the type bars, is wound upon spools 111 and 111a fastened to plates 9R and 9L of frame 6, said ribbon being advanced and reversed with the movement of the machine in any customary manner, preferably in the same manner as that used in the Burroughs adding machine. In this instance I have used as motive power to actuate the spools 111 and 111a and ribbon 110 and to effect the reversing or advancing of the ribbon, a tape 113 (see Fig. 1), fastened at one end to the arm 113a of the lever 113b pivoted at 113c. Said lever 113b works in engagement with spool 111 by a ratchet 113F, (see Fig. 5) in the customary manner, not necessary here to describe. Said tape passes around a pulley 114 pivoted on a frame 114c secured to base 501, and is attached to the end of slotted plate 114b. On the upper left hand side of slide plate 85, the arm 85a is rigidly fastened and extends laterally to the left, ending in a pin 85b which passes through a slot in plate 114b and holds said plate by a screw head 85c.

When the slide plate 85 is drawn toward the rear, as previously explained, the pin 85b engages the rear end of a slot in plate 114b and swings the lever 113b to the left and downward. Upon the return of the slide plate the spring 115, fastened at one end to the base 501 and at the other end to the lower end of the arm 113a of the lever 113b swings said lever upward and to the right. It is necessary that the plate 114b be slotted because the motion of slide plate 85 is much greater than is necessary to actuate the lever 113b and spools 111 and 111a.

Of the type shifter bars for printing numerals, there are eight in number, corresponding to the eight columns of numeral keys in the adding machine, and in addition there are four other type shifter bars, of which one, 117, (Fig. 3) moves type for printing the several months of the year, two, 118, move type for printing the numerals which indicate the day of the month, and one, 119, moves type for printing the monogram signatures of the several operators of the machine. The printing position of these bars is not ordinarily changed during the several operations of entering pass book deposits, but only when necessary on account of a change of the day of the month, or of the month, or of the monogram of the operator. To effect this change, there are provided racks 120 (see Fig. 3) upon the upper rear sides of the bars, which severally engage pinions 121 on the end of shafts 122 which have suitable bearings 123 in the frame 123b and are provided with heads 124 by which said shafts can be turned to bring any desired type on said type shifter bars to the printing position.

It will be observed from Fig. 4 that the type 118 remains normally at the proper place for printing, the other type of the series adjacent the same moving one space whenever the zeros are to be printed.

On the face of each head 124 is a dial with the months of the year inscribed on one, the units of the days inscribed on another, tens of units of days inscribed on the next, and numbers of the various operators inscribed on the fourth. When these shifter bars are moved to desired printing position, a notch 124b in the edges of the heads 124 engage a spring 124c fastened to the frame 123b thereby keeping said shifter bars in a fixed position.

In other respects the construction of said type shifter bars and of the type bars shifted thereby and of the type supporting bars is the same as for the ordinary numeral type, except that the type shifter bar 117 which moves the type for printing the several months of the year is made of two bars, fastened together by pins, and each bar having on its inner surface grooves which guide the vertical movement of the type bars 117A. This construction is made necessary because of the greater size of said type bars 117A.

As outlined before my device is intended especially, although not exclusively, for the entry of deposits in a pass book, for keeping a separate printed record of all such entries, and for accumulating the total of all said entries. By the foregoing description and the drawings, it will be seen that, whenever the numeral keys 528 are depressed and the handle 529 actuated, an amount corresponding to the keys depressed will be printed in a pass book at 300, the same figures will be printed at 991 on a roll or piece of paper on the platen 990, and the accumulator wheels will register or accumulate a like amount.

A feature of my invention which is very important is a provision, to be described later, by which, at the discretion of the operator, amounts will be printed in two places and accumulated as above, or the pass book printing attachment can be made inoperative, leaving the Burroughs machine free to list and accumulate amounts, print the totals of the same, and clear the accumulator wheels, or print a sub-total and return the total in said wheels, and perform the other functions of said adding machine, as outlined by the specifications and drawings of the patents before mentioned.

To keep an absolute accumulation of all entries made in pass books, I have provided a separate series of accumulator-wheels or pinions which are in mesh, and operative, only when the pass book printing attachment is operative, and are out of mesh, and inoperative, when said pass book printing attachment is inoperative.

As before explained the accumulator frame of the Burroughs machine rocks with the rock-shaft 900 to which it is rigidly fastened, said frame being composed of side plate 910L and 910R suitably joined together by longitudinal shafts and rods, said rock-shaft, longitudinal shafts and rods being tied together by cross-plates, said cross-plates being extended at the forward end, and each forward end having bearings in which rests the shaft 903, said shaft also resting in bearings at its ends in the side plates 910L and 910R. On said shaft revolve the accumulator units, each unit being composed of a pinion with a cam fastened on one side.

Each cam 921 mentioned above has a projecting toe, adapted to engage the lower bent end of a lever 924, thereby, in conjunction with mechanism described in other patents and more especially Letters Patent Number 504,963 granted to W. S. Burroughs on Sept. 12, 1903, providing means by which any pinion is moved one step whenever the pinion next preceding, or of lower order, completes a revolution. Also, as has been previously explained in Burroughs patents, the straight shoulder 923 of said cam serves to engage the top portion of the lower bent end of lever 924 upon the reverse revolution of said pinion, limiting this reverse revolution to zero. On the other side of said pinion is secured a figure wheel having the numerals 0 to 9 inscribed on its edge; these figures indicating to the operator the amount accumulated in said pinions.

Pivoted on the rock-shaft 900 and locked against longitudinal movement thereon is the locking frame 940 composed of side pieces 941L, 941R, to which are securely fastened plates each plate having upwardly projecting points or dogs 946, said dogs being capable of meshing with the pinions as explained before.

Said side-plate 941L has a rearwardly projecting arm 947 on which is a pin 948 (Fig. 2) projecting outwardly, said pins 948 engaging in the slot 917d of the upper arm 917c of the lever 917 pivoted at 917e on the stud 917F projecting inwardly from the frame.

When the accumulator frame is rocked forwardly on the shaft the lower end of the side plate 910L forces the arm 917a of lever 917 downward, lowering the arm 917c and thereby slightly rocking the lock-frame 940, the points 946 of said lock-frame moving upwardly and meeting the pinions 920.

I have described the accumulator pinions, accumulator frame and lock-frame of the Burroughs machine, to explain the methods by which the changed accumulator pinions, frame and lock frame of my invention are adapted to the mechanism of the Burroughs machine. I will now describe the accumulator mechanism used in my invention. As will be seen by Figs 2, 8, and more particularly by Fig. 1 the accumulator frame which I use is composed of side-plates 910L and 910R rigidly fastened to the rock-shaft 900 by means of hubs 902L and 902R, I having retained the side-plates used in the Burroughs machine.

Connecting both side plates at their middle upper ends and rigidly fastened thereto is a shaft 903 on which is mounted a sleeve 904, said sleeve being shorter than said shaft, and mounted on said sleeve and revolving freely thereon are eighteen accumulator units, each composed of a pinion 920, a small spacing collar 920a and a cam 921, the pinion, collar and cam of each unit being riveted together, and each unit being separated by spacing collars 905 and 906, each collar being held in fixed position on said sleeve by a set screw 907. On the side of the second unit from the right and each alternate unit to the sixteenth inclusive is fastened a figure-wheel 920b, which wheels have inscribed on their several edges the numeral figures 0 to 9 inclusive.

To the right of the first unit on the right is the end plate 908R securely fastened to said sleeve by a set screw 919, said end plate extending downward and being pivoted on the rock-shaft 900. A similar end plate 908L is securely fastened on said sleeve at the extreme left of the accumulator units, said plate extending downwardly and bent inwardly, and is also pivoted on the rock-shaft 900 at 900A. Pivoted on said rock-shaft and between the end-plates 908R and 908L is a sleeve 939 to which are rigidly fastened at either end the side-plates 941L, 941R, of the lock frame 940, said side plates being rigidly connected together by the longitudinal rods 942 and 943. Said longitudinal rods 942 and 943 are tied together by cross plates 944 944, extending from rod 942 forwardly and slightly beyond rod 943, each, together with the side plates 941L, 941R, having upwardly formed projections or dogs 946, capable of meshing with the pinions as before described. Riveted on the inner side of said plates 941L and 941R are additional plates 941A (Fig. 8) which extend on the outside of said dogs 946L and 946R, these plates forming flanges to said dogs. As in the construction of the Burroughs machine the side-plate 941L of the locking frame has a rearwardly extending arm 947 on which is securely fastened a pin 948 projecting outwardly. Said pin engages in the slot 917D of the upper arm of lever 917 as in the normal construction of the Burroughs machine, except, that in this instance this pin is slightly longer to allow for the engagement of said pin in said slot during the longitudinal movement of said locking frame on said rock-shaft, to be explained later.

Dependent from said side plate 941L of the locking frame is the short arm 964, and dependent also from the sleeve on which said locking-frame is fastened and to the right of said arm 964 is the arm or plate 965. These two plates are held vertically below said rock-shaft and together form a guideway which is engaged by the pin 167 of crank-arm 166 of the accumulator shifting device, to be explained later. It will be seen then that said locking frame on its sleeve and said accumulator units on the sleeve 904 are capable of being moved longitudinally and in unison on the rock-shaft 900, and the shaft 903 of the accumulator frame, and the extent of said longitudinal movement, which is the distance between centers of the first (beginning on the right) and second pinion wheel is limited by the hubs 902L, 902R on said rock-shaft.

As will be seen by Fig. 8, of the eighteen accumulator units on the shaft 903 of the accumulator frame, nine are opposite to, and capable of meshing with, the racks 601 of levers 603, and the corresponding cams of these pinions are opposite to, and capable of engaging with, the lower bent end of the lever 924 of the transfer mechanism. The accumulator units not thus in mesh are locked on the locked points 925 dependent from the transverse bar 660 fastened at either end in the frame of the machine. These pinions are locked in this method when the accumulator frame is in its normal position, and, when said accumulator frame is thrown forward and downwardly in the normal action of the machine, these idle pinions are locked on the dogs 946 set opposite to them on the locking frame, as previously explained.

As it will be seen then, I provide one series of accumulator units in mesh and operative, and a like series out of mesh and inoperative. The series shown in mesh in Fig. 8, I term the pass book printing accumulators, as these accumulate the entries of said forward printing devices previously explained, and, as will be seen they are composed of each alternate unit, commencing with the second from the right hand side, to the eighteenth unit.

As heretofore explained, when the handle 529 of the Burroughs machine is actuated, and at the first portion of said movement, the accumulator frame is thrown forward and downwardly out of mesh and all the pinions are locked on the dogs of the locking frame. While in this position, by mechanism to be explained later, I provide means by which all the accumulator units, together with the locking frame may be shifted a limited distance to the left or right according to the position of said accumulators. If in this manner the accumulators, as shown in Fig. 1 were shifted to the left, upon the return of the handle 529, the pinions formerly in operation would be opposite the racks 601, and in mesh therewith, and the corresponding cams would be in position to engage the belt foot of the lever 924 of the transfer mechanism. Also accumulating units which would have been shifted to the left and out of mesh would engage the locked points 925 dependent from the transverse shaft 660 attached to the frame of the machine. In this instance the series now operative I term the adding machine accumulators.

As will be readily seen, the action of either series of accumulators, when in mesh, will be exactly similar to the action of the single series of accumulators in the Burroughs machine, as the pinions, cams and spacing collars of each unit are made identically like those in use in that mechanism, making it possible, by means of either set of accumulators and the other actuating parts, to add and accumulate the totals of individual items, to print the total thereof, and to clear the accumulators, or to print a sub-total thereof, allowing said sub-total to remain in the accumulators, and to perform all the various functions of the accumulators in the Burroughs adding machine.

The figure-wheels, normally attached to the side of the pinions of the accumulators in the Burroughs machine, have been retained on the accumulator units for the pass book printing device of this machine, and are used to indicate to the operator the total amount of the entries made in said pass books. To avoid confusion, no figure-wheels are attached to the adding machine accumulators, as it is a very easy operation to determine said total by the depression of total key 550, and the actuation of the handle 529, whereupon said total is printed on a piece of paper on the platen 990.

It is extremely important that the shifting of the accumulators, by which either the adding machine accumulators or the pass book printing accumulators are shifted into proper position, be accomplished by some means requiring little skill on the part of the operator, and that said shifting mechanism be positive in its action. Therefore, referring particularly to Figs. 6, 7 and 24, I have provided on the top of the lower frame two keys 133 and 134, connected with suitable mechanism to be explained later, by which the depression of either one of these keys sets this said mechanism, so that, upon the next operation of the handle 529, the accumulators are shifted automatically and according to the key depressed. When the key 133 is depressed it sets the mechanism so that, upon the next operation of the handle 529, the accumulators for the adding machine will be shifted into mesh, and when the key 134 is depressed this mechanism is set for the automatic shifting into mesh of the pass book printing accumulators.

Said keys are attached to stems 135, 136, which are in the form of plates, said plates moving vertically in slots 281a and 281b formed in the top of the lower casing 280. Said plates, depending in said slots, are opposite each other and at equal distances from the shaft 138, and have slots 135b and 136b therethrough, through which extend the ends of a transverse lever 137 attached to a shaft 138 rotating in a front bearing 139 in an arch piece 139a fastened at either end to the side plates 9 of the frame 6, and in a rear bearing 140 in the front bar 501F of the frame 501. The engagement of the ends of the transverse lever 137 with the slots 135b, 136b, in the key-plates 135, 136, is such that, upon the depression of one key, said transverse lever 137 is rocked, and the other key is elevated through an equal height.

To the rear end of said shaft is attached a crank 141, having a pin 142, which works in a slot 143 formed in a transverse rod 144, whereby, upon the depression of the key 133 or 134, said shaft 138 is rocked, raising or lowering said transverse rod 144.

Attached to the main driving shaft 540 of the Burroughs machine is a short crank arm 191 (see Fig. 4), with pin 191b therein, which engages in a slot 192b of a link 192, the other end of which link is twisted through a right angle, and is pivoted to an arm 193 (see Fig. 3) upon a sleeve 194 having its bearing on a vertical rod 195, said rod having a lower bearing 196 in the base 501 of the machine, and an upper bearing in a bracket 197 secured to the frame of the machine. The function of this rod will be hereinafter explained. Said sleeve carries on its upper end a crank arm 199, which is loosely pivoted to the rod 144.

Thus as the main shaft 540 of the Burroughs machine rocks in the direction of the arrow on the forward movement of the handle 529, said transverse rod 144 is reciprocated longitudinally to the right (see Figs. 3 and 6), returning to its former position on the return movement of said handle. The left hand side of said rod is bifurcated, as shown at 145, and by the rocking movement of said shaft 138, due to the depression of one or the other of the keys 133, 134, as previously explained, the bifurcated end of the rod is raised or lowered. The two sides of the fork 145 are formed with inwardly extending hooks 146, 147, bent at a right angle to said transverse rod 144, so that, in the upper position of the fork, the lower hook 147 can engage a lower pin 149, extending rearwardly from a shield 150, while in the lower position of the fork, the upper hook 146 can engage a similar pin 148.

Said shield is secured to a rock shaft 151 (see Fig. 5), having a bearing 152 in a standard 153 secured upon the base plate 501. By reason of such engagement, when said rod 144 is moved to the right, the said fork 145, by means of one or the other of said pins 148, 149, rocks said shield.

From the rear end of the rock shaft 151, upon which said shield is secured, extends downwardly an arm 166, having thereon extending at right angles and rearwardly a pin or ball 167 which rocks between two plates 964 and 965 previously described, so that, by the rocking of said shaft 151, the accumulators on the sleeve 904 are rocked to the right or left, said accumulators, as has been previously described, sliding upon the shaft 903. This motion has the effect of moving one series of pinions 920, together with one series of transfer cams, out of mesh with the actuating sectors of the Burroughs machine, and the other series into mesh therewith, accordingly as key 133 or 134 is depressed.

When one of the keys 133, 134, is depressed, so as to move the rod 144 down or up, the forked end thereof does not immediately engage the pin 149, or 148, when the handle is actuated, because, as has been previously explained, it is necessary that the accumulator frame and the accumulator pinions drop forwardly and downwardly upon the dogs 946 of the lock-frame before the shifting of said accumulators can be accomplished.

It is for this reason that I have provided the slot 192b in the rear end of link 192, so that the pin 191b of crank arm 191 moves idly in said slot for a short distance, this idle movement being so timed that the pin does not engage the forward end of said slot until, in the normal action of the machine, the accumulator pinions rest on the locking frame.

Said shield 150 is provided with a forwardly extending pin 154, arranged at equal distances from the pins 148, 149, and to the right thereof which enters a slot 155 formed in an arm 156 extended from a vertical rod 157, the upper end of which rod is pivoted to an arm 158 of a bell crank lever 158b. Said bell crank lever 158b is pivoted upon the shaft 535 of the Burroughs machine to the left of the arm 534L, the upper arm, 158c, being formed like the previously described forwardly projecting arm of the arm 534L. Said vertical rod 157 (see Fig. 5), is yieldingly pressed against the arm 158 of bell crank lever 158b by a spring 164 secured to said rod 157, the upper end of the spring being attached to the shield 150, and thus holds the rearwardly bent arm 158c under a pin 553 attached to the arm of bell crank lever 551, and, when in this position, said pin 553 and total key 550 cannot be depressed.

When the shield 150 is rocked so as, by the action of the pin 154, to depress the rod 157, the bent arm 158c of the bell crank lever 158b is drawn forward, and out of engagement with the pin 553, thereby allowing said total key 550 to be actuated. On the contrary, when the pin 154 moves upward in the slot, as when the pass book accumulator is shifted into mesh, the rod 157 is moved upward by the spring 164, thereby locking the total key as previously explained.

The object of this mechanism is to lock the total key 550, and render the totalizing and clearing mechanism of the Burroughs machine inoperative, when the accumulator for accumulating the totals of the pass book entries is in mesh, thereby preventing the operator from returning said accumulator wheels to zero and thereby rendering an incorrect total of the entries made in pass books.

From the lower end of the rod 157 extends laterally to the left an arm 165, which, when the door 288 in the lower casing of the machine is opened, can be reached through said opening 288 and drawn downwardly, thus rocking the bell crank lever 158b forwardly, so that the total key 550 can be depressed, the handle operated, the total of pass book entries printed, and the corresponding pinions reset to zero, this arrangement being provided for the purpose of clearing the machine at the end of a day, or for the purpose of clearing the pass book accumulator. Upon release of arm 165, and return of total key 550, said lever 158b resumes its rearward position locking said total key, as before explained.

As will later be explained, said casing 280 covers all this mechanism last described, and the arm 165 of rod 157 cannot be reached or actuated except through the opening 288, which is capable of being closed by a door provided with a proper lock 290 and key 291 (see Fig. 1), thereby preventing the depression of said arm when said door is locked.

I have already referred to the necessity of so safeguarding the pass book accumulators that the total of pass book entries registered therein cannot be fraudulently changed. In adding machines of this general type, it is possible, when there is a total registered in said accumulators, to add a sufficient sum by depressing the keys 528 and operating the handle 529, so that each pinion-wheel is rotated to zero and the total sum of this accumulation is beyond the capacity of the accumulators, thereby practically clearing the adding mechanism. To avoid such manipulation, I have provided on the inside of the end plate 908L, an inwardly extending pin 909, (Figs. 8, 9) which pin is so placed as to engage the cam 922B at an inwardly curved portion 923b on the same, when pinion wheel 920B and cam 922B, (which as will be seen from the drawings, are the last unit of the pass book series to the left) are rotated through a greater distance than the equivalent of eight. The effect of the engagement of said cam with said pin will be to lock said pinion 920B, together with the racks 601, lever 603, frame 613, and practically all the mechanism of the Burroughs machine, making said machine inoperative, and requiring the removal of the upper outside casing before the pin 909 can be removed to unlock the mechanism.

As will later be explained, said upper casing can only be removed when the door 288 is unlocked and opened. It follows, then, that the custodian of the key for the said lock 290 of said door will be apprised of the fraudulent manipulation of the accumulator wheels, before the adding machine can again be used for any purpose.

In the usual construction of the Burroughs machine, and as explained heretofore, the printing of individual items occurs slightly before the end of the forward stroke of the handle 529, while the accumulation of this printing is not accomplished until afterward, during the return stroke of the handle, and the return of the sector-levers 603 and their racks 601 to normal position.

It is important that shift keys 133 or 134 be not depressed accidentally, as by an object falling on either key, or through carelessness, and that the operator who is responsible for the entries in said pass books should be enabled to lock the pass book shift key 134 against depression, so that the pass book printing device cannot be used by an unauthorized person.

Also it will be seen that if it were possible to depress the numeral keys 528 and the shift key 133 at the same time, upon the actuation of the handle 529 an amount would be printed in the pass book at 300, but, owing to the shifting of the accumulators, this amount should be registered in the adding machine accumulators, thereby defeating the main object of the invention. Further, if it were possible to depress the total key 550 and the shift key 133 upon the following stroke of the handle 529, there would be a strain of my accumulator shifting device on the accumulators at the time that they were in mesh with the rack bars 601 of the Burroughs machine, thereby breaking or locking the mechanism.

To prevent depression of either of these keys through accident or carelessness, as above mentioned, there is provided a transverse bar 202 (Fig. 35) which can slide in bearings 202L and 202R in side plates 9 of frame 6, (Figs. 1, 6, 7) said bar being located in the forward portion of said frame and at right angles thereto and extending to the right and through a slot 294 (Fig. 15) in the lower casing 280 to be described later, said bar terminating at its right hand end in a key 203, which key and the end of bar 202 are located in a recess 295 in the adjacent side of said casing 280. Near the right hand end of said bar and within the casing is fastened a stop-plate 202a, and dependent from said bar on the right hand side is a stud 206b to which is secured a tension spring 206, the other end of said spring being secured to said casing. Said transverse or shift bar is capable of a sliding longitudinal movement and by said tension spring, is normally held to the right and against said casing at the stop-plate 202a.

On the rear side of the plate 136 of key 134 there is formed a notch 205, said notch being of sufficient size to receive the front side of said shift bar as later explained. When said key 134 is in its elevated position, the lower end of plate 136 is slightly above and directly over the front edge of said bar 202, so that key 134 is held locked in its elevated position. If the key 203 is pressed inwardly, sliding said shift bar to the left, a vertical groove 204 in the front side of said shift bar is brought directly under the lower edge of the plate 136 of the key 134. Thereupon, if the key 134 is depressed, its lower end, which had before engaged the top of said shift bar, now passes through this vertical groove 204, and, upon the release of said shift bar, as will be explained later, the said bar to the left of the groove 204 engages in the notch 205 of the key-plate 135. As the movement of either of the two keys 133, 134, reciprocates the other, it will be seen that the key 133 is now locked in an elevated position and remains locked until such time as the lock-key 203 is again pressed inwardly. Thus, as a precaution against accidental movement of accumulator shift keys, I provide a lock-key which must be actuated before either key 133, 134, can be depressed.

In order that the operator who is responsible for the entries in said pass books may be enabled to lock the pass book accumulator key 134 against depression, I provide, slightly to the rear of key 203, and within the casing, a lock of suitable character with a key-barrel showing on the outside of said casing. The plunger 285b of said lock 285 is arranged to be thrown by the actuation of the key 285a (see Fig. 1) directly to the left of stop-plate 202a on the shift-bar 202, and, when in this position, it locks said shift bar. The operator of the mechanism is thus enabled at any time to lock the accumulator keys, and said key 285a can be removed from said lock, so that the accumulators cannot be shifted until such time as the key is again used. This is important, because, as will later be explained, when the adding machine key has been depressed and the handle actuated the forward printing device will be inoperative. As the operator will be responsible for the entries made by his machine, it is important that he should have means of locking the pass book printing device against operation. This is provided by the key 285a, which he can retain in his possession after locking the accumulation key 133 in a depressed position.

Secured to the rearwardly extending arm 210 attached to said shift bar 202 is a pin 211 (Fig. 3) which engages a slot 212 in an arm 213 secured to the rod 195. As before explained this rod rotates in bearings 196 and 197. Upon the upper end of said rod 195 and extending at right angles thereto slightly to the right is an arm or plate 214 (see Fig. 6). Secured to the rock shaft 535 of the Burroughs machine is an arm 216 which extends in a forward direction and is bent outwardly at its forward end, so that, in the normal position of the Burroughs machine, the end of said arm is to the right of the shaft 195 and slightly below the plate 214.

As previously explained, upon the depression of the numeral keys 528, said rock shaft 535 is rocked in the direction of the arrow shown in Fig. 4; therefore, if a numeral key has been depressed and it is endeavored to press in key 203, the arm 216 will have been rocked in the path-way of the rotation of plate 214, locking said plate and thereby locking said key 203. If the key 203 has been thrust inwardly, the plate 214 is rocked above the arm 216, thereby locking the rock shaft 535 and preventing the depression of the numeral keys 528.

Forward of the shift bar 202 is an arm 207 pivoted on a pin 207a dependent from the frame 501, said arm being held normally in a rearward position by a spring 207b, fastened at its forward end to said arm and at its rearward end to a pin 207c dependent from the frame 501. When said shift bar is actuated, the rearwardly bent end of arm 207 engages in a slot 208 on the forward side of shift bar, and holds said shift bar to the left. This position is maintained until the handle is operated, whereupon the forwardly extending end of link 192 (see Fig. 4) engages the rear side of arm 207, forcing the end of this arm out of the notch 208 and releasing the shift bar 202, so that said shift bar can assume its normal position by reason of the tension of the spring 207b.

As has been previously explained, in the normal action of the Burroughs machine, when the handle 529 has been actuated, the numeral keys 528 and the total key 550 are locked against depression. The release of the shift bar 202 is so timed as to take place after such numeral keys and total keys are locked as before described. In this manner I provide against the depression of the accumulator shift keys 133 or 134 when a numeral key has been depressed, and also prevent the depression of the numeral key 528 when either one of the accumulator shift keys are set to actuate the accumulator shifting device.

In the well known construction of the Burroughs machine, when the total key 550

(see Fig. 2) has been depressed, it rocks the bell crank lever 551, to the lower arm of which lever is pivoted a link 555, the forward end of said link being pivoted to the crank arm 556, rigidly attached to the rock-shaft 557. Said rock-shaft is pivoted in the upper side frame and extends transversely across the machine; therefore, when said key has been depresssed, the rock-shaft is rocked in the direction of the arrow (see Fig. 4). On the right hand side of said rock-shaft, and rigidly attached thereto, I have secured an arm 218, said arm extending forwardly and downwardly as shown in Fig. 4, and having a depending segment 219. When at rest the upper shoulder 218a of this arm is on a level with the upper side of the arm 216 previously described and directly to the right thereof. Upon the depression of the total key, as previously explained, the lower bent end of arm 218 is rocked upwardly and opposite to plate 214; and therefore, when said total key 550 is depressed, the key 203 cannot be actuated, as the end of plate 214 will engage the left hand side of the segment 219 of the arm 218.

If the key 203 has been actuated, the end of the plate 214 is rocked over the shoulder 218a of the arm 218, thereby locking said arm, and locking said total key 550 against being depressed. In this manner I provide means by which the total key cannot be actuated when the accumulator shift keys 133 or 134 are in position to set the accumulator shifting devices; nor can these keys be operated when the total key is depressed.

It is of decided importance that, when the accumulator shift key 133 or 134 is actuated, it be depressed to the full extent of its downward movement to properly set the shifting mechanism as before described. To prevent a person dishonestly, or through carelessness, depressing either one of said keys part way only, thereby straining the mechanism or obtaining an incorrect result, I have provided the following means by which, unless said key 133 or 134 is depressed the full extent of its stroke, the operation of the Burroughs machine is locked, and the same is rendered inoperative. Secured to and dependent from the rock-shaft 138, which is rocked when either key 133 or 134 is depressed, is an arm 220 (see Fig. 6), at the lower end of which is pivoted one end of a slide-bar 221, which bar extends to the right and in a horizontal position, and the right hand end of which rests in a bearing 222 dependent from the base 501. Said slide bar is held directly over the forward end of the link 192, and has on its under side two notches 223 and 224, spaced apart a distance through which said slide bar moves when rocked by the key 133 or 134. On the upper side of said link 192 is secured an upward projection or rib 225, which is adapted to enter one or the other of said notches, according to the key depressed, and the position of the slide bar 221. When the key 133 is fully depressed, the notch 223 is in register with the rib 225, allowing the link 192 and said rib to reciprocate through said notch with each movement of the handle 529. If key 134 is fully depressed, the notch 224 is in like position. However, if either key is only partially depressed, then the slide bar 221 will will be in such a position that the rib 225 will abut against the side of said slide bar between the notches 223 and 224, thereby locking the movement of said handle until said key has been fully depressed. As said rib is of greater length than the distance through which the link 192 is reciprocated, it follows that the key 133 or 134 can only be depressed when said link, and the handle 529, are in their normal positions.

I have before referred to the fact that, when the key 133 is depressed for shifting in the adding machine accumulator, the front printing mechanism of my invention is automatically locked against operation. It is also of extreme importance that all, or at least as much as possible, of the mechanism of my attachment should be disassociated from the adding machine, so that the weight of the moving parts and the friction thereof should not be materially increased, or changed from those of the Burroughs machine in ordinary use. It is also necessary to make the pass book printing mechanism inoperative when the accumulation is being effected by the adding machine accumulator. I accomplish these results by the following arrangement: Attached to the lower end of the plate 135 of the key 133, which I have termed the adding machine key, extends laterally a pin 227, (Figs. 6, 7) which engages a slot 228 of an arm 229 extending forwardly and being secured to a rock-shaft 230, said rock-shaft having suitable bearings 230a in the plates 9L and 9R of the frame 6. On the left hand end of said shaft 230 there is secured a crank arm 231, a rearwardly extending arm of which is connected by a short link 232, which link is pivoted to a lever 233. Said lever being pivoted at its forward end at 233a on the outside of left hand plate 9L of frame 6. At the rear end of said lever and pivoted thereto is a hanger frame 235, composed of side plates 235a held together at both ends by pins 235b and 235b, on which pins rotate the pulleys 234 and 236.

The forward end of the link 61, which, as before described, actuates the hammers of the pass book printing device, projects through the hanger 235 between the plates 235a and 235a, and during the normal action of the machine reciprocates therethrough. Said link has, on its lower forward side, a notch 237 which engages the pin 238 attached to the crank arm 60 of the pass book printing attachment, as previously described. When the pass book accumulating shift key 134 has been depressed, said hanger and lever are in a depressed position, and the link 61 engages the pin 238 as shown in Fig. 5. However, when the adding machine accumulator key is depressed, thereby rocking the shaft 230 and elevating the rear end of lever 233, the lower pulley 236 of the hanger 235 engages the lower forward end of the link 61, and elevates the link from being in engagement with the pin 238, thereby rendering the pass book printing attachment inoperative.

Each time the handle 529 is actuated, the link 61 reciprocates through the sides of said hanger as before described, and slides on said pulley 236 at the lower end of said hanger. When the pass book printing key 134 is depressed, the shaft 230 is rocked in the opposite direction, thereby lowering the rear end of lever 233, and forcing the upper pulley 236 downwardly on the upper side of link 61, and the notch 237 of said link in engagement with the pin 238.

As before explained, the slide plate 85, together with the platen plate 86 and the supporting plate 87, form a traveling pass book carriage, and reciprocate with each movement of the handle.

To prevent the reciprocating of said carriage when the machine is used as an adding machine only, I have devised the following means for automatically locking said carriage in its rearward position, upon the adding machine key 133 being depressed and the handle 529 actuated (see Fig. 5): One of the plates 235a of the hanger 235 has an extended lower portion, at the bottom of which is formed a slot 240 which engages a pin 241 carried at the forward end of a lever 244, said lever being pivoted at 245 on an arm of the bracket 246 dependent from the bottom plate 501 of the Burroughs machine. A spring 242, attached at its lower end to said pin 241 and at its upper end to a stud 243 extending outwardly from said hanger, yieldingly holds said pin in said slot. Said bracket has a rearward extension 246a, having at its rear end a vertical slot 248, in which actuates a vertical plunger 247, dependent from the rear end of the lever 244 and pivoted thereto.

Upon the depression of the adding machine shift key 133, the lever 233 is elevated at its rear end, and, by the tension of spring 242, the plunger 247 projects below the base of the bracket 246a. When the handle 529 is actuated, and the slide-plate moved rearwardly, said plunger engages an inclined surface 249 formed on the rear end of said slide plate, and raises said plunger against the tension of the spring 242. During the remainder of the rearward movement of the carriage, the plunger rides on the upper face of said slide plate, and is adapted to engage in the slot 256 in said slide-plate, owing to the tension of spring 242 upon the completion of said rearward movement, thereby locking said carriage in this position.

The lever 102, which normally draws the pass book carriage to the rearward position, is loosely pivoted on a rock-shaft 540 of the Burroughs machine, and as shown in Fig. 2 of the drawings, said rock shaft has a pin 102a secured thereon which is formed to engage a shoulder on the hub of said lever 102, thereby, in the normal action of the machine, elevating the arm at the forward stroke of the handle 529. When the plunger has locked the pass book carriage in a rearward position, as before explained, the lever 102 is in an elevated position, and as there is no tension on the tape 103, said lever is held in this position by the spring 102b attached at one end to the upper side of said lever and at the other to the frame of the Burroughs machine. In this manner the traveling pass book carriage is rendered inoperative during the time when the adding machine key has been depressed.

Upon the depression of the pass book printing key 134, and the consequent lowering of the hanger 235, the pin 241 engages the upper end of slot 240, thereby withdrawing the plunger from the slot in the pass book carriage, whereupon, by the tension of the spring 108, said carriage is drawn to its forward position.

As the tension of springs 30 attached to type-shifter bars 11 and the friction of moving said type shifter bars requires some slight effort on the part of the operator, I have devised the following means to lock said type-shifter bars, together with the levers 19 in their normal position, when this mechanism is used for an adding machine only:

On the right hand end of rock shaft 230, and on the outside of plate 9R of frame 6, there is secured an upwardly extending crank arm 251, which has an outward extending pin 252, which pin engages in the slot 253 of the link 254. On the rear end of said link is formed an open ended slot 255, in which can travel a pin 256, extending outwardly from the upper arm 261 of the bell crank lever 262 pivoted on the stud 262a secured to the plate 9R of the frame 6. Said pin is held in said slot by the tension of a spring 259 attached thereto at its rear end and at its forward end to a pin 254a extending outwardly from said link 254.

Midway between said plates 9L and 9R, and to the left of the type shifter bars 11 on said transverse bar 31, is secured a shoulder on which is pivoted the forwardly extending arm 262c and, pivoted to this arm and to the forwardly extending arm 262b of the bell crank lever 262, is a dependent lock plate 264. Attached to the pin 256 of the bell crank lever 262 is a tension spring 257, the rear end of said spring being attached to an outwardly extending pin 258 secured to the outside of plate 9R, so that the tension of this spring yieldingly holds the lock plate 264 in its upper position. On the upper sides of type shifter bars 11 and to the rear ends thereof, there are formed eleven grooves 267. When the machine is at rest the first groove 267a is directly under the lock plate 264 which is so adjusted that, upon the depression of the key 133, known as the adding machine key, the link 254 is drawn forwardly, and as the tension of spring 259 is much greater than that of the spring 257, the pin 256 is drawn with said link, thereby rocking the bell crank lever 262 and forcing the lower edge of lock plate 264 into the said first groove. Thereupon, when the adding machine is actuated, and the levers 603 moved downward, the type shifter bars are held inoperative, and the levers 19 are held in an upright position. When the pass book key 134 is depressed, the link 254 resumes its former position, because of the tension of spring 257, thereby drawing the lock-plate 264 out of the grooves 267 in type shifter bars 11.

As the accumulation of the Burroughs machine, and that on my attachment as well, is not effected until after the printing, it would be possible for a fraudulently disposed person to print an amount in the pass book at 300, then, holding the handle 529 in a forward position, force the rear end of lever 603 downward, in the manner raising the rack 601 attached thereto at its forward end, whereby, upon the return of the handle to its normal position and engagement of the accumulators, an incorrect result would be recorded in said accumulators.

To provide against a fraudulent manipulation of this character, I have provided means by which, before the hammers 45 are released, each type shifter bar 11 is held in a locked position, and is retained in said locked position, until the accumulator frame moves rearwardly and the pinions are in mesh with their respective racks.

As mentioned above, I referred to eleven grooves formed on the top and at the rear ends of the type shifter bars 11, and explained that the first groove, toward the forward end of said bars, was for locking said type shifting mechanism when the adding machine keys were depressed. The other ten grooves are spaced so as to be of distances corresponding to that of the grooves on the forward end of said bars in which are dependent the type bars 35. Therefore it follows that, when the type shifter bar is moved forward, bringing any one of said type bars to a printing position, one of said grooves will be directly under, and in a position to engage, the locked plate before referred to.

Extending outwardly from the cam plate 54R on the right hand side of the frame 6, is a pin 270 which engages in a slot 270a in the link 254 already referred to. As heretofore explained, the cam plate 54R rocks forwardly on the rock shaft 46. During the first portion of said forward movement the pin 270 move idly in the slot 270a. However, before the ends of stop plate 50 move upward, upon the inclined surface of said cam plate, thereby releasing the hammers 45, said pin engages the forward end of the slot 270a, in this manner drawing the link 254 forward, thereby rocking the bell crank lever 262, and forcing the lock plate 264 downward into those grooves 267 of the type shifter bars 11, which are in line therewith. In the further movement of said cam plate, the spring 259, already referred to, is extended. The slot 253 at the forward end of said link 254 allows for the forward movement of said link idly on the pin 252 attached to crank arm 251 already referred to.

Upon the return movement of the handle, and the consequent return movement of the cam plate 54R, said type shifter bars 11 are not released until the increased tension in spring 259 has been relieved, thereby allowing a short period of rest in the movement of said link 254, which is sufficient, and is so timed, that the accumulating frame 901 will have returned to its normal position before the spring 257 has withdrawn the lock plate from the grooves 267.

As the main object of this invention is to provide that all amounts printed at 300, either in a pass book, or on a sheet of paper, be registered in the accumulators, and so that it will not be possible to fraudulently change the printing, or the result of said printing in said accumulators, I have provided a casing which covers the entire lower part of my attachment.

As will be seen from Figs. 12 and 14, the base plate 4 is composed of a single piece of metal, and extends outwardly on all sides beyond the base 501 of the Burroughs machine and is attached thereto by hangers 3, as explained. The edges of the base are formed with upwardly extending sides 4a. On the left hand side, and toward the forward end, is formed the bearing 90a for the shaft 90 previously described.

The case 280, as shown in Figs. 13, 14, and 15, is preferably made of one piece of metal, having four sides in the form of a box open at the bottom, and having an opening in the top, formed of the inwardly bent portions of the top 280A, which has been planned to fit snugly around the base 501 of the Burroughs machine. On three sides and a portion of the front the lower edge of the casing 280 has an inwardly formed flange 280*f*, (Fig. 1) so that when the casing is placed upon the base plate 4 it rests upon the upwardly turned edges of said base plate.

On the forward side of said casing is formed a narrow opening 297 of practically its entire width, through which, when in place, projects the pass book carriage as before described. On the forward right hand side is the depression 295 having a downwardly extending slot 294 from the center of said depression to its lower edge. To the rear of the depression 295, and secured on the inner side of said casing, is the lock 285 with a key hole extending to the outside. On the upper forward part are located the two grooves 281*b*, extending vertically through the top of said casing. On the left hand side there is an oblong opening closed by the door 288, which door is locked by the lock 290 secured to the inside of said door, said lock being actuated by the key 291 which can be inserted in a key hole on the outside of said door.

When the handle 529 of the Burroughs machine, and the platen 990 with its carriage and other mechanism, have been detached therefrom, it is possible to drop the case 280 over said Burroughs machine and on to the base-plate 4. When this has been done, the plates 136, 137, of the accumulator shift keys 133, 134, protrude through the slots 281*b* formed in the front forward portion of said case, so that the keys 133 and 134 can be fastened on said plates by any suitable means. The lock shift bar 202 is thus opposite an opening 294 at the bottom of a recess 295 formed on the right hand side of said case. The key to this lock shift bar 203 can then be fastened to said bar by any suitable means. When the case is in this position I provide means such that it can be locked as follows: On the left hand side of the base 501 of the Burroughs machine, I provide an upwardly extending hole 501*g*, which hole is opposite a similar one 208*g* in the upper left hand side of the case 280, both being properly threaded to receive a screw 297.

In the well known construction of the Burroughs machine there is provided a case 501*h*, which covers the entire mechanism of said machine, leaving only the opening at the rear where printing is effected and a small opening where the handle is attached. This case 501*h* rests upon the base plate 501 of the said Burroughs machine. To lock this case against being removed, I provide a hole 501*i* through the left hand side of base plate 501, extending upwardly and into said upper case 501*h*, these holes being properly threaded, so that a screw 297*b* can be turned therein. It will be seen, then, that by means of these screws 297 and 297*b*, the upper case 501*h*, the base plate 501 and the lower case 280 can be fastened together. These screws are so situated that they can be operated only through the opening 289, when the door 288 normally closing said opening is unlocked. Thus said upper or lower cases cannot be removed except by using the key 291 to said lock 290 on said door 288.

As has been previously explained, this machine is for the purpose of entering in a pass book or on a check the amount of money received by the custodian of the machine, and at the same time to enter in the book or on the check the date and signature of the machine operator, means being provided for accumulating the amounts so entered and for printing such amounts in an additional printing place upon a suitable record strip for the convenience of the person in charge of the machine. And since the expense of having at hand a machine for the express purpose of printing in books or upon a check is considerable, means are provided whereby the machine may be used as an adding and listing machine independently of the book printing devices, thus securing the advantages of each machine at the cost of but little more than one.

Assuming the machine to be used as a pass book printing device, the pass book key 134 (Fig. 1) would be in a depressed position and the series of accumulators shown in engagement with the racks 601 in Fig. 1 would be operative. The operator takes the pass book, or the sheet upon which he is to print in one hand and pushes the lever 91 (Figs. 1 and 2) backward to separate the platen plate 86 from the plate 85; whereupon he slips the sheet upon which the record is to be made between said plates, the printing position being indicated by slots 97 in the plate 85 (Fig. 7).

If it is desired to make an entry in a pass book, the leaf on which the record is to be made is inserted between platen plate 86 and slide plate 85, the balance of the book being inserted between supporting plate 87 and platen plate 85, except that portion of the book which will extend laterally to left or right of these plates according to whether entry is made on right or left hand sheet of said book (Figs. 1, 2 and 3). The handle 91 is now released and the springs 93 (Fig. 2), which normally hold the plates 86 and 87 in the upper position, lock the sheet and book in place. The desired keys on the machine may now be depressed and the handle 529 may be pulled forward to effect the several operations of the Burroughs machine. As this handle 529 is pulled forward, the arm 102 (Figs. 2 and 4) moves upwardly and through the band 103 pulls the slide plate 85, the platen plate 86 and the supporting plate 87, together with the book clasped therebetween, to the rear and into the machine to the proper printing position. As will later be explained at this position and at almost the end of the forward stroke of the handle 529 the printing is effected. Upon the release of the handle, as the arm 102 returns downwardly to its normal position the spring 108 (Fig. 4) returns plates 85 and 87 and the platen plate 86, together with the book, to their normal position projecting from the machine.

Within the machine and adjacent to the platen 86 are a series of nine numeral type 35 (Figs. 3 and 4), one series for each lever 603a of the Burroughs machine. The operation of the handle 529 carries out the operation of the Burroughs adding machine in the usual manner, not necessary to note here in, save to observe that the lever 603a and the rack 601 move downwardly a variable distance corresponding to the key actuated, and as the lever 603a and the rack 601 move downwardly they permit the springs 30 to push horizontal type shifting bars 11 and type 35 forward through the movement allowed pivoted lever 22 on the pin 24, which pin is attached to lever 603a, thereby positioning type corresponding to the movement of the lever 603a (Fig. 4). After setting of the type, the hammers 45 are released over such of the type as have been positioned for printing purposes and the impression is taken through the slot 97 (Fig. 3), which as explained has been drawn to printing position. Upon the initial movement of the handle 529 in the ordinary operation of the Burroughs adding machine the accumulators move forwardly out of contact with the racks 601 and move rearwardly into contact with said racks on the return stroke of said handle and accumulate on said return stroke the amount printed.

At the left of the numeral type bars over the book printing platen there are other type, the object of which is to insert correctly the date and signature of the machine operator in the book (Figs. 1 and 3). These type are shifted by wheels 124 (shown in Figs. 3 and 2) and are moved only when necessary to change the readings from day to day or otherwise, one type of each series remaining at all times in the proper position for printing purposes. Also these wheels 124, as will later be explained, are normally inaccessible.

As lever 603a moves downwardly its rear arm 603 is rocked upwardly, thereby positioning type 618 (Fig. 2) corresponding to the pass book printing type positioned at 38 (Fig. 4), and in the further operations of the Burroughs machine a duplicate record is obtained on the platen 990 (Fig. 2) of the amount printed in the pass book. While the pass book printing mechanism is operative and the accumulators for totalizing the amounts printed in pass books are in mesh, the total key 550 (Fig. 2) of the Burroughs machine is locked against operation in its upper position, so that the operator cannot normally print the total in the accumulator, or clear that total. However, on the left hand side of the lower casing of the machine is a door 288 (Figs. 1 and 13) arranged with a suitable lock 290 and key 291, so that the custodian of this key can open this door and upon pressing downward the lever 165 (Figs. 1 and 2) the accumulators are held in mesh on the downward stroke of the racks, thereby positioning the type representing the totals in said accumulators at both printing positions and clearing said accumulators. This door 288 also gives access to the wheels 124 previously mentioned.

In order to prevent the clearance to zero of the pass book totalizers by the mere addition thereto of a suitable quantity, the last totalizer unit at the left (see Figs. 8 and 9) is provided with a notched cam, which, upon partial rotation, will move into contact with the pin 909 (see Figs. 10 and 44), thus locking the entire machine for the reason that the accumulation occurs after all of the other movements have been completed, so that the driving rack 601 will be held by said accumulators in some position other than one in which it can move to the top of its throw to permit the release therefrom of the accumulator units. It will, of course, be understoood by those skilled in the art that the operating mechanism of the Burroughs machine cannot be returned to its initial position until the complete cycle of operations has been completed so that when the racks are stopped on their return stroke the entire machine is locked.

It will be seen from this brief description that the pass book is held in the pass book carriage, is drawn within the machine, receives thereupon the impression of the date and the operator's signature and the amount, and is returned to the operator. The amount printed therein is accumulated upon one set of accumulators and a duplicate amount is printed upon a strip or sheet of paper at 990, and the pass book accumulators cannot normally be cleared except by the custodian of the key 291.

When it is desired to use the machine simply as an adding and listing machine, the key 133 (Figs. 1 and 5) is depressed. The depression of this key sets the shifting arm 144 (Figs. 1, 6 and 43), so that upon the actuation of the handle 529 the pass book accumulators are shifted out of mesh to the left and to a locked position and the adding machine accumulators are shifted into mesh.

This shifting of the accumulators to the left also serves to pull the link 157 downward, thereby rocking the bell crank lever 158b (Figs. 5 and 6), and in turn releasing the total key 550 (Fig. 2) so that it can be actuated.

The depression of key 133 also raises the lever 233 (Fig. 5), which in turn raises the link 61 out of engagement with the printing devices adjacent to the pass book platen, so that in the further operations of the machine said link 61 reciprocates idly and the hammers 45 (Fig. 4) are held in a raised position.

Further the depression of this key serves to lock the type shifter bars 11 in their normal rearward position through the means of link 254 forcing plunger 264 downward into the first slot 267 on the rear portion of said type shifter bars 11 (Fig. 4).

In this manner the pass book printing device is rendered inoperative. The platen plate 86 together with plates 85 and 87 normally are drawn within the machine and are again projected partially therefrom on each actuation of the handle 529. However, the depression of key 133 further serves to force the plunger 247 (Fig. 5) downward so that when the plates 85, 86 and 87 are next drawn within the machine the lower end of this plunger will engage the slot 256 (Figs. 5 and 32) on the left hand rearward part of the plate 85, thereby through the tension of spring 242 (Fig. 5) holding said plunger in said slot and locking said plates 85, 86 and 87 in their rearward position.

It will be seen that the pass book printing device and the platen carriage plates 85, 86 and 87 are locked against operation and the adding machine is free to perform its ordinary functions of accumulating the amounts printed upon a separate accumulator.

When it is desired to again use the pass book printing device key 134 (Fig. 1) is depressed, thereby releasing the type shifter bars 11 (Fig. 4), forcing the link 61 into engagement with the pass book printing device (Figs. 2 and 5) and withdrawing the plunger 247 from slot 256 (Fig. 5), thereby releasing the pass book carriage and allowing it to assume its normal position, and upon the operation of the handle 529 the adding machine accumulators are shifted to the right into a locked position and the pass book accumulators are shifted from an inoperative position into engagement with the racks 601 (Fig. 1), while the total key 550 is again locked and rendered inoperative.

To insure that keys 133 and 134 (Fig. 1) can be locked and to prevent the operation of these keys through accident or fraud a lock bar 202 ending in a key 203 is provided (Figs. 1 and 6). This bar engages the lower end of key 134, so that this key is locked in either its upper or lower position unless key 203 is thrust inwardly and as keys 134 and 133 are linked together by pivoted bar 137, the locking key 134 locks key 133 as well.

In operation key 203 must be pushed inwardly before either key 133 or 134 can be operated. If it is desired to lock the pass book printing device, so that it cannot be operated, this mechanism is rendered inoperative, as explained, and by means of lock 285, the operator can use key 285a, held in his custody, to throw the bolt 285b of the lock to the right of the lug 202a (see Figs. 1, 6 and 7), thereby rendering key 203 and key 134 inoperative.

To prevent the depression of the numeral keys 528 or the total key 550, when either shift key 133 or 134 are operated, lock bar 202 actuated by key 203 when actuated rocks the short arm 214 to the right (Figs. 6 and 7) over the bent arms 218 and 216. One of these arms is rocked upwardly when the numeral keys are actuated, the other when the total key is actuated. Therefore, the numeral keys or the total key cannot be actuated when the arm 214 is rocked to the right as the arms 218 and 216 are held immovable. If a key total or numeral is operated before key 203 is actuated the sides of arms 218 and 216 interfere with the movement of arm 214, preventing the movement of bar 202 a sufficient distance to unlock the keys 133 and 134.

I claim:—

1. In combination, a type-supporting bar formed with a notch at printing position, a type-shifter bar, a series of type shifted thereby and supported on said type-supporting bar, a controller arm, provided with means for normally holding out of said notch the several type in their movement with the shifter bar, means for actuating said arm to allow any desired type to move into said notch, and means for actuating said arm to move said type out of said notch, substantially as described.

2. In combination, a type-supporting bar formed with a notch at printing position, a type-shifter bar, a series of type shifted thereby and supported on said type-supporting bar, a controller arm, provided with means for normally holding out of said notch the several type in their movement with the shifter bar, a spring adapted to actuate said arm to move the type out of said notch, and means for actuating said arm against said spring to permit the type to move into said notch, substantially as described.

3. The combination of a series of totalizers coördinated with a series of type, means for automatically bringing any desired type of the series into printing position, a casing surrounding said means, a platen adapted to carry a sheet of paper from the exterior to the interior of said casing into proximity with said type and to return the same, means for moving said platen automatically with the movement of the type, and means for printing from said type on said sheet, substantially as described.

4. The combination of a series of totalizers coördinated with a series of type, means for automatically bringing any desired type of the series into printing position, a casing surrounding said means, a platen adapted to carry a sheet of paper from the exterior to the interior of said casing into proximity with said type and to return the same, means for moving said platen, and means for printing from said type on said sheet, substantially as described.

5. The combination of a series of totalizers coördinated with type, a support therefor, and means for moving any desired type to bring into position, a platen, comprising a plurality of plates adapted to clasp and hold a book or sheet, means for reciprocating said platen into and out of proximity with said type so brought into printing position, and means for printing from said type upon said book or sheet, substantially as described.

6. The combination of a slidable plate, a platen plate, and a supporting plate, means at the rear ends of said plates for preventing horizontal relative movement at said rear ends, said plates being otherwise free as to their relative movements, means for pressing said plates together, the slide plate being formed to allow an impression to be made on a portion of the platen plate, type for making said impression, and means coördinated with said type for accumulating the total of the amounts printed thereby, substantially as described.

7. The combination of a slidable plate, a platen plate, a facing of yielding material upon the platen plate, and a supporting plate, means at the rear ends of said plates for preventing horizontal relative movement at said rear ends, said plates being otherwise free as to their relative movements, means for pressing said plates together, the slide plate being formed to allow an impression to be made on a portion of the platen plate, type for making said impression, and means coördinated with said type for accumulating the total of the amounts printed thereby, substantially as described.

8. The combination of a series of accumulator units shiftable longitudinally into and out of their operative positions, type-positioning means, a connection whereby the operation of said type-positioning means can also so shift said accumulator units, two keys operable alternately and each exclusively of the other, a device adapted to be moved by said keys into either of two positions, and means whereby, when said device is so moved into one of said positions said type-positioning means is operative to shift the accumulator units and in the other position thereof is inoperative, substantially as described.

9. The combination of a series of accumulator units, shiftable into and out of their operative positions, means for so shifting said units, two keys, a device adapted to be moved by said keys respectively into either of two positions, and means whereby, when said device is so moved into one of said positions, said shifting means is operative, and, when moved into the other position, it is inoperative, substantially as described.

10. The combination of two series of accumulator units, either series exclusively of the other being adapted to be operatively connected with computing devices, means for shifting said units to move either series, as desired, into operative relation with said devices, two keys, a device adapted to be moved by said keys respectively into either of two positions, and means whereby, when said device is so moved into one of said positions, said shifting means is operative, and, when moved into the other position, it is inoperative, substantially as described.

11. The combination of accumulators, devices for shifting said accumulators to render them operative or inoperative, numeral keys, computing devices controlled by the respective numeral keys, said accumulators coöperating with said computing devices, and means, operated upon the depression of said numeral keys, for preventing the operation of said shifting devices, substantially as described.

12. The combination of accumulators, devices for shifting said accumulators to render them operative or inoperative, numeral keys, computing devices controlled by the respective numeral keys, said accumulators coöperating with said computing devices, means, operated upon the depression of said numeral keys, for preventing the operation of said shifting devices, and means rendering said shifting devices inoperative with the return of the numeral keys to their normal position, substantially as described.

13. The combination of accumulators, devices for shifting said accumulators to render them operative or inoperative, computing devices, numeral keys for controlling the same, a total key for recording a total of said computing devices, and means for preventing the actuation of said shifting devices when said total key is depressed, substantially as described.

14. The combination of accumulators, devices for shifting said accumulators to render them operative or inoperative, computing devices, numeral keys for controlling the same, a total key for recording a total of said computing devices, means for shifting said devices, means for setting said devices in a position whereby they may be so shifted by said last-named means, and means whereby, when said shifting devices are so set but not operated, the total key is rendered inoperative, and means for preventing the actuation of said shifting devices when said total key is depressed, substantially as described.

15. The combination of accumulator units, shifting devices therefor, setting means for moving said shifting devices into and out of their operative positions, means for moving said shifting devices when set in their operative positions, a device adapted to lock said setting devices against movement, a casing for the mechanism and a lock for said latter devices extending to the outside of the casing and adapted to be operated by a key inserted from the outside, substantially as described.

16. The combination of a series of totalizers, two recording means for said totalizers, unitary means for operating both of said recording means, means to accumulate on the totalizers the amounts recorded after the record has been made, a key, and means whereby, when said key is operated, one of said recording means is rendered incapable of being operated by said unitary means, substantially as described.

17. The combination of computing devices, two series of accumulators, either series being adapted exclusively of another to coöperate with said computing devices, two series of recording devices, unitary means for actuating said recording devices, and unitary means for rendering one of said recording devices inoperative and moving one of said series of accumulators out of operative relation with the computing devices, substantially as described.

18. The combination of computing devices, two series of accumulators, either series being adapted exclusively of another to coöperate with said computing devices, two series of recording devices, unitary means for actuating said recording devices, unitary means for rendering one of said recording devices inoperative and moving one of said series of accumulators out of operative relation with the computing devices, and means whereby the movement of said series of accumulators out of operative relation with the computing devices is completed by the operation of the means for recording from said computing devices, substantially as described.

19. The combination of a series of computing devices, two series of type, means for positioning each of said type correspondingly to the different positions of the computing devices, means for recording from each series of type, a key, and means, controlled by the movement of said key, whereby, in one position of the key, both said type-positioning means and recording means are actuated, and in the other position only one of said means is so actuated, the other remaining stationary, substantially as described.

20. The combination of a series of computing devices, two series of type, means for positioning each of said type correspondingly to the different positions of the computing devices, means for recording from each series of type, a carriage adapted to reciprocate and carry a recording sheet to receive a record from one of said series of type, means for reciprocating said carriage, a key, and means, controlled by the movement of said key, whereby, in one position of the key, both said type-positioning means and recording means are actuated, and in the other position said reciprocating means is rendered inoperative and only one of said means is so actuated, the other remaining stationary, substantially as described.

21. The combination of a series of computing devices, two series of accumulators adapted to alternately coöperate with said computing devices, two corresponding series of recording devices, and a total key arranged by its depression to record totals of the computing devices, substantially as described.

22. The combination of two series of computing devices, corresponding recording devices, means for rendering one series of computing devices and corresponding recording devices operative or inoperative as desired, a key for clearing said computing devices, and means for rendering said key inoperative when said series of computing devices, and recording devices are rendered operative, and conversely, substantially as described.

23. The combination of two series of computing devices, corresponding recording devices, means for rendering one series of computing devices and corresponding recording devices operative or inoperative as desired, a key for clearing said computing devices, and means for rendering said key inoperative when both of said series of recording devices are operative, substantially as described.

24. The combination of two series of computing devices, corresponding recording devices, means for rendering one series of computing devices and corresponding recording devices operative or inoperative as desired, a key for clearing said computing devices, means for rendering said key inoperative when said series of computing devices and recording devices are rendered operative, and conversely, a casing for inclosing the above recited mechanism, and key-controlled means for rendering said first-named key operative when said last-named computing and recording devices are operative, substantially as described.

25. In a pass book printing machine, a calculating machine having two series of totalizers, a book holding platen, type bars adjacent said platen, means whereby said type bars are correlated with the totalizers to accumulate the amounts printed thereby upon the pass books on one of said series of totalizers, means to shift the mechanism to operate either of said sets of totalizers and means to lock the pass book printing mechanism so that it cannot be operated unless its totalizer is operated, substantially as described.

26. In a pass book printing machine, a calculating machine having two series of totalizers, means whereby either of said totalizers may be connected with the calculating machine mechanism, a pass book printing platen, type bars thereover, means to accumulate the items printed upon said pass book on one of said totalizers, means to lock the calculating machine and printing mechanism and means to change the mechanism from one to the other of said totalizers when so locked, substantially as described.

27. In a pass book printer, a calculating machine having two series of totalizers, a pass book printing platen, type bars over said platen, means to correlate said type bars and one of said series of totalizers to accumulate thereon the items printed upon said pass book, means to change the mechanism so that one or the other series of totalizers will be operated and means to lock the pass book printing mechanism to prevent its operation when the calculating machine totalizers are operated, substantially as described.

28. In a pass book printer, a calculating machine having two series of totalizers, a pass book printing platen, type bars thereover, means to correlate one of said series of totalizers with said type bars whereby items printed upon the pass book are accumulated on one of said series of totalizers, means to change the mechanism from one to the other series of totalizers at will and a second set of type which will print items which are accumulated on one of said series of totalizers, substantially as described.

29. In a pass book printer, a calculating machine having two series of totalizers, a pass book printing platen, type bars adjacent said platen, means to correlate one of said series of totalizers and said type bars, whereby items printed upon said pass book are accumulated upon said series of totalizers without interfering with the other series of totalizers, means to change the mechanism to operate one or the other series of totalizers and means to lock the pass book printing mechanism so that it cannot be operated when the pass book printing totalizers are not in use, substantially as described.

30. In a pass book printer, a calculating machine having two series of totalizers, a pass book printing platen, type bars adjacent the same, means to correlate said type bars and one of said series of totalizers to accumulate thereon the items printed upon the pass book by said type bars without interfering with the other series of totalizers, means to lock the machine out of operation and means to shift the mechanism from one to the other series of totalizers when the machine is so locked, substantially as described.

31. In a pass book printer a calculating machine having a series of totalizers therein, a pass book printing platen projecting from said machine, type bars adjacent said platen, means to retract said platen into the machine, means to print on said platen items which are accumulated upon said totalizers, means to cause said type bars to print totals, and means for making the striking of said totals normally inaccessible, substantially as described.

32. In a pass book printer, a calculating machine having a series of totalizers therein, a pass book printing platen projecting from said machine, type bars adjacent said platen, means to retract said platen laterally into the machine to print thereon items which are accumulated upon said totalizers, slidable rack bars supporting the latter type bars and pinions for shifting the rack bars, other type bars adjacent said platen to print several additional characters thereon, substantially as described.

33. In a pass book printer, a calculating machine having a series of totalizers therein, a pass book printing platen projecting therefrom, a strip printing platen, means to retract the pass book printing platen into the machine, means to print on each of said platens items which are accumulated upon said totalizers and the totals on said totalizers, other type bars to print several additional characters upon said pass book, longitudinally movable bars carrying the latter type bars, and normally inaccessible manual means for shifting said bars, substantially as described.

34. In a pass book printer, a calculating machine having a series of totalizers therein, a pass book printing platen, means to secure the pass book to the platen in a fixed position thereon, a strip printing platen, means to retract the pass book printing platen into the machine, means to print upon the strip printing platen and the pass book printing platen the items and the totals accumulated upon the totalizers, shiftable type bars to print several additional characters upon the pass book when the items are printed therein and means to return the pass book printing platen to its initial position for the removal therefrom of the pass book after printing, substantially as described.

35. In a pass book printer, a calculating machine having a series of totalizers therein, a pass book printing platen projecting from said machine, type bars adjacent said platen, means to secure a pass book to the platen, means to retract said platen into the machine, means to print at will on said platen items or totals accumulated on said totalizers and means to return said platen to its initial position, substantially as described.

36. In a pass book printer, a calculating machine having a series of totalizers therein, a pass book printing platen, type adjacent said platen, means to cause said type to print on said platen items which are accumulated upon one of said series of totalizers, means to prevent the clearance to zero of the latter series of totalizers by the mere addition thereto of a suitable quantity, means to change the mechanism to operate either of said series of totalizers and means to lock the series of totalizers not in use, substantially as described.

37. In a pass book printer, a calculating machine having two series of totalizers therein, a pass book printing platen, type adjacent said platen, means to cause said type to print on said platen items accumulated upon one of said series of totalizers, means to prevent the clearance of the last mentioned series of totalizers to zero by the mere addition thereto of a suitable quantity, means to change the mechanism to operate either of said series of totalizers and means to lock the type bars adjacent the platen out of use when the corresponding series of totalizers is not used, substantially as described.

38. In a pass book printer, a calculating machine having a series of totalizers therein, a laterally movable pass book printing platen, a strip printing platen, type adjacent each of said platens, means to cause said type to print items accumulated upon and the totals from said totalizers, shiftable type bars for printing several additional characters upon the pass book printing platen and means to print such additional characters upon the pass book platen when the items accumulated upon the totalizers are printed, substantially as described.

39. In a pass book printer, a calculating machine having two series of totalizers therein, a pass book printing platen projecting therefrom, a strip printing platen, means to retract the pass book platen into the machine, type adjacent each of said platens, means to print on each of said platens items and totals accumulated upon the totalizers, means to shift the mechanism to operate either of said totalizers, means to lock the pass book printing type bars out of action when the corresponding totalizers are not used without interfering with the operation of one of the totalizer series and strip printing mechanism, and means to prevent the clearance to zero of the pass book totalizers by the mere addition thereto of a suitable quantity, substantially as described.

40. In a pass book printer, a calculating machine having two series of totalizers, either of which may be connected with the operating mechanism, means to lock the mechanism, means to shift the mechanism from one to the other series of totalizers when so locked, a pass book printing platen, type to print upon said platen the items accumulated upon one of said series of totalizers, means to lock said type bars out of action when the totalizer corresponding thereto is out of action and means to prevent the clearance to zero of that totalizer by the mere addition thereto of a suitable quantity, substantially as described.

41. In a pass book printer, a calculating machine having two series of totalizers, a pass book holding platen, type adjacent said platen, means correlated with one of said series of totalizers to accumulate the amounts printed upon the pass book, means to shift the operating mechanism from one of said series of totalizers to the other, means to lock the type adjacent the platen out of action when the totalizers correlated therewith are not used and means to lock said platen in the machine, substantially as described.

42. In a pass book printer, a calculating machine having two series of totalizers, means to connect either series of totalizers with the operating mechanism, a pass book printing platen, type adjacent said platen, means to cause said type to print on the pass book platen the items accumulated upon one of said series of totalizers, means to prevent the clearance to zero of the series of totalizers correlated with the pass book printing type, means to shift the mechanism to operate either series of totalizers and means to lock the shifting device in either position after the shift has occurred, substantially as described.

43. In a pass book printer, a calculating machine having two series of totalizers, a pass book printing platen, type adjacent said platen, means to correlate said type and one of said series of totalizers to accumulate thereon the items printed upon the pass book, means to lock the adding machine mechanism to prevent its operation, means to shift the mechanism to operate either series of totalizers and means to lock the shifting device after the shift has been accomplished, substantially as described.

44. In a pass book printer, a calculating machine having two series of totalizers, a pass book printing platen, type adjacent said platen, means to correlate said type bars with one of said series of totalizers to accumulate thereon the items printed upon the pass book, means to lock the adding machine mechanism to prevent its operation, means to shift the mechanism so that one or the other series of totalizers may be operated, means to lock the type adjacent the platen when the totalizer correlated therewith is not used and means to lock the shifting device after the shift has been accomplished, substantially as described.

45. In a pass book printer, a calculating machine having two series of totalizers, a pass book printing platen projecting from the machine, means to move said platen laterally into the machine, type adjacent said platen, means to correlate said type and one of said series of totalizers to accumulate thereon the items printed upon the pass book, means to lock the adding machine mechanism to prevent its operation and means to shift the mechanism so that one or the other series of totalizers may be operated at will, substantially as described.

46. In a pass book printer, a calculating machine having two series of totalizers, a pass book printing platen, means to retract said platen into the machine, type adjacent said platen, means to correlate said type with one of said series of totalizers to accumulate thereon the items printed upon said pass book, means to retract said platen into the machine to effect said printing, means to project said platen from the machine after the printing has been accomplished, means to shift the mechanism from one to the other of said series of totalizers and means to lock the type bars and platen when the totalizers correlated therewith are not in use, substantially as described.

47. In a pass book printer, a calculating machine having two series of totalizers, a laterally movable platen, type adjacent said platen, means whereby said type may be correlated with the operating mechanism to accumulate the amounts printed thereby on one of said series of totalizers, means to change the mechanism to operate either of said sets of totalizers, means to cause said type to print the totals upon said platen and means to lock the type adjacent said platen so that they cannot be used unless the totalizer correlated therewith is operated, substantially as described.

48. In a pass book printer, a calculating machine having two series of totalizers, means to operate either of said series of totalizers with the adding machine mechanism, a laterally movable platen, type adjacent said platen, means to move said platen into and out of said machine, means correlated with said type to accumulate upon the totalizers the items printed upon the platen, means to print the totals from said totalizers upon said platen and means to lock the totalizers out of operation during the change of the machine from one set of totalizers to the other, substantially as described.

49. In a pass book printer, a calculating machine having a series of totalizers, a book platen, a strip printing platen, type adjacent both of said platens, means to accumulate upon said totalizers the items printed upon each of said platens and means whereby each set of type may be caused to print the totals upon said totalizers, substantially as described.

50. In a pass book printer, a key controlled mechanism having a series of totalizers, a platen projecting from the machine, means to secure a book to the platen, type adjacent the platen, means to retract said platen into the machine, means to print on said platen amounts corresponding to the keys actuated, means to accumulate upon said totalizers the amounts so printed, means to print upon said platen the totals on said totalizers, means to return the platen to its initial position and means to prevent the clearance of the totalizers by the addition thereto of a quantity which would bring them all to zero, substantially as described.

51. In a pass book printer, a key controlled mechanism having a series of totalizers, a platen projecting from the machine, means to secure a book to the platen, type adjacent said platen, means to retract said platen into the machine, means to print on said platen when so retracted amounts corresponding to the keys actuated, means to accumulate the printed amounts on the totalizers, means to print the totals upon said platen and means to return the platen to its initial position, substantially as described.

52. In a key controlled machine having two series of totalizers, means to position a book within the machine, type to print items in said book when in said machine, means to accumulate on one of the totalizers the printed items, means to lock said type out of use when the totalizer correlated therewith is not used and means to print totals from either of said series of totalizers, substantially as described.

53. In a key controlled mechanism having two series of totalizers, means to position a book within the machine, type to print items in said book when in said machine, means to accumulate on one of the totalizers the printed items, means to lock said type out of use when the totalizer correlated therewith is not in use, means to change the mechanism to the other series of totalizers only when so locked and means to print totals from both series of totalizers, substantially as described.

54. In a key controlled mechanism having two series of totalizers, a pass book printing platen, type adjacent said platen, means to cause said type to print selected items, means to accumulate said items upon one of said series of totalizers, means to prevent the clearance to zero of the latter series of totalizers by the mere addition thereto of a suitable quantity, means to operate either of said series of totalizers and means to print totals appearing upon each of said series of totalizers, substantially as described.

55. In a pass book printer, a key controlled machine having two series of totalizers, a pass book printing platen, a strip printing platen, type adjacent each of said platens, means to cause said type to print on said platens corresponding items, means to accumulate said items upon one of said series of totalizers, means to change the mechanism to operate either of said series of totalizers, means to lock said mechanism when about to be changed to prevent the operation thereof, means to prevent the clearance to zero of one of said series of totalizers by the mere addition thereto of a suitable quantity and means to lock the printing devices adjacent the book printing platen when the totalizer correlated therewith is not in use, substantially as described.

56. In a pass book printer, a calculating machine two series of totalizers therein, a book printing platen, type adjacent said platen, means to cause said type to print selected items, means to accumulate said items upon one series of totalizers, means to cause said type to print the totals registered on said totalizers, means to prevent the clearance to zero of the totalizer series correlated with the book printing platen by the addition thereto of a suitable quantity, means to change the mechanism to operate either series of totalizers, means to lock the machine out of operation when such change is to take place, means to lock the printing device adjacent the book printing platen out of use when the series of totalizers correlated therewith is not used and separate type for use with the other set of totalizers, substantially as described.

57. In a pass book printer, a calculating machine having two series of totalizers, a pass book printing platen projecting therefrom, a strip printing platen, means to retract the book platen into the machine, a printing device adjacent to each of said platens, means to print selected items upon each of said platens, means to accumulate upon one of the totalizer series the items so printed, means to cause one of said printing devices to print totals, means to change the mechanism to operate either of said totalizers, means to lock the pass book printing devices out of action when the totalizers correlated therewith are not used, without interfering with the normal operation of the machine and other totalizer series and means to prevent the clearance of the pass book totalizers to zero by the addition thereto of a suitable quantity, substantially as described.

58. In a pass book printer, a key controlled machine having a series of totalizers, a platen projecting therefrom, means to secure a book thereto, means to retract said platen into the machine, type adjacent said platen, means to print upon said platen selected items when so retracted, means to accumulate the items so printed upon the totalizers, means to print totals shown on said totalizers upon said platen and means to return said platen to its initial position, substantially as described.

59. In a pass book printer, a key controlled machine having a series of totalizers therein, a platen projecting from said machine, type adjacent said platen, means to print upon said platen when so retracted items which are accumulated upon the totalizers, means to prevent the clearance of the totalizers to zero by the addition thereto of a suitable quantity, means to print totals upon said platen and means to return said platen to its initial position, substantially as described.

60. In a pass book printer, a calculating machine, totalizers therein, a set of type correlated with said totalizers to accumulate thereon the items printed by the type, a printing platen adjacent said type, means to cause said type to print selected items, means to cause said type to print totals upon said platen and means to draw said platen into the machine to be printed upon, substantially as described.

61. In a pass book printer, a calculating machine, totalizers therein, a set of type correlated with said totalizers to accumulate thereon the items printed by the type, a printing platen adjacent said type, means to cause said type to print selected items, means to cause said type to print totals, means to draw said platen into the machine to be printed upon and means to extend said platen from said machine after the printing has been accomplished, substantially as described.

62. In a pass book printer, a calculating machine, two series of totalizers therein, two series of type correlated with the totalizers to accumulate thereon items printed by the type, means whereby the machine may operate either series of totalizers, means to print the totals on one series of totalizers from one set of type and means to print the totals on the other series of totalizers from both sets of type, substantially as described.

63. In a pass book printer, a calculating machine, two series of totalizers therein, two series of type correlated with the totalizers to accumulate thereon the items printed by said type, means whereby the machine may operate either series of totalizers, means to print the totals on one series of totalizers from one set of type, means to print the totals on the other series of totalizers from both sets of type and means to lock the machine when the shift from one series of totalizers to the other is to be made, substantially as described.

64. In a pass book printer, a calculating machine, two series of totalizers therein, two sets of type correlated with the totalizers to accumulate thereon the items printed by the type, means whereby the machine may operate either series of totalizers, means to print the totals on one series of totalizers from one set of type, means to print the totals on the other series of totalizers from both sets of type, means to prevent the clearance to zero of that series of totalizers correlated with each of said sets of type by the mere addition thereto of a proper quantity and means to print several additional characters adjacent one of said sets of type, substantially as described.

65. In a pass book printer, a calculating machine, two series of totalizers therein, two sets of type correlated with the totalizers to accumulate thereon the items printed by the type, means whereby the machine may operate either series of totalizers, means to print the totals on one series of totalizers from one set of type, means to print the totals on the other series of totalizers from both sets of type, means to lock the machine while the change is being made from one series of totalizers to the other and means to lock the shifting devices after the change is accomplished, substantially as described.

66. In a pass book printer, a calculating machine, two series of totalizers therein, two sets of type correlated with the totalizers to accumulate thereon the items printed by the type, means whereby the machine may operate either series of totalizers, means to print the totals on one series of totalizers from one set of type, means to print the totals on the other series of totalizers from both sets of type, a platen upon which the printing from one set of type is done, means to lock the machine when the change is to be made from one series of totalizers to the other and means to lock the shifting devices after the change is accomplished, substantially as described.

67. In a pass book printer, a calculating machine, two series of totalizers therein, two sets of type correlated with the totalizers to accumulate thereon the items printed by the type, means whereby the machine may operate either series of totalizers, means to print the totals on one series of totalizers from one set of type, means to print the totals on the other series of totalizers from both sets of type, a platen adjacent one of said sets of type and means to prevent said set of type from being printed from when the series of totalizers correlated therewith is not used, substantially as described.

68. In a pass book printer, a calculating machine, two series of totalizers therein, two sets of type correlated with the totalizers to accumulate thereon the items printed by the type, means whereby the machine may operate either series of totalizers, means to print the totals on one series of totalizers from one set of type, means to print the totals on the other series of totalizers from both sets of type, a platen, means to prevent the set of type adjacent said platen from printing when the totalizers correlated therewith are not used and means to lock said platen when its totalizers are not in use, substantially as described.

69. The combination with a calculating machine having totalizers of means to prevent the clearance of said totalizers to zero by merely adding thereto suitable quantities, means to lock the entire machine should an attempt be made so to clear said totalizers, means to print items which items are accumulated on the totalizers and means to print the totals shown by the totalizers, substantially as described.

70. The combination with a calculating machine having totalizers of means to prevent the clearance of the totalizers to zero by merely adding thereto suitable quantities, normally inaccessible means to clear said totalizers when necessary and means to print items which are accumulated on the totalizers, substantially as described.

71. The combination with a calculating machine having totalizers, of means to prevent the clearance of said totalizers to zero by merely adding thereto suitable quantities, means to print items which items are accumulated on the totalizers and means whereby the parts of the machine may be restored to their normal position should any of the operating mechanism be incorrectly set, substantially as described.

72. The combination with a calculating machine having totalizers, of means to prevent the clearance of said totalizers to zero by merely adding suitable quantities thereto, means whereby the entire machine is locked should an attempt be made to clear the totalizers by adding such quantities thereto as would bring said totalizers all to zero, normally inaccessible means whereby said totalizers may be cleared when necessary and means to print items which are accumulated on the totalizers, substantially as described.

73. The combination with a calculating machine having totalizers of means to prevent the clearance of the totalizers to zero by merely adding suitable quantities thereto, normally inaccessible means to clear said totalizers when necessary, means to print items which are accumulated on the totalizers and normally inaccessible means for printing the totals so accumulated, substantially as described.

74. The combination with a calculating machine having totalizers of means to prevent the clearance of the totalizers to zero by merely adding thereto suitable quantities, means to print the items which items are accumulated on the totalizers, normally inaccessible means to permit the printing of the totals and a correction key for restoring the mechanism to its normal position should an error be made, substantially as described.

75. The combination with a calculating machine having totalizers of means to prevent the clearance of the totalizers to zero by merely adding thereto suitable quantities, means to print items which items are accumulated on the totalizers, normally inaccessible means to clear the totalizers when necessary and means whereby the type may be locked so that an unauthorized person cannot print therefrom nor operate the totalizers, substantially as described.

76. In a calculating machine having totalizers, two series of type to print items and totals in two places separate from the totalizers, means whereby the printing at each of said places and accumulation of the items will occur after the setting of the mechanism and a single operating lever for effecting the printing and accumulation, substantially as described.

77. In a calculating machine, two series of totalizers, means whereby the machine may operate either series of totalizers, devices to accomplish the change from one series of totalizers to the other, mechanism for locking the shifting devices after the change is accomplished and means to lock one series of printing devices so that an unauthorized person cannot print therefrom, substantially as described.

78. The combination of a calculating machine having two series of totalizers, two sets of type to print items which are accumulated on the totalizers, means to prevent the clearance of one series of totalizers to zero by merely adding thereto proper quantities, normally inaccessible means for clearing that series of totalizers and normally inaccessible means for clearing the other series of totalizers, substantially as described.

79. The combination with a calculating machine having two series of totalizers of two series of printing devices, means whereby either series of totalizers may be operated independently of the other, two printing devices and mechanical means to render uniform the successive printing operations at each printing place, substantially as described.

80. The combination with a register having totalizers of type for printing at two separate places, means for causing said type to print items and totals, means to render the successive printing operations at each place substantially uniform and a correction key for eliminating mistakes should any such be made in setting the operating mechanism of the machine, substantially as described.

81. The combination of a calculating machine having totalizers, actuators therefor, a plurality of series of type, means for operating the type, means whereby the type are variably positioned for printing either items or totals and mechanical means for producing substantially uniform impressions from said type so positioned and means to accumulate the printed items on the totalizers, substantially as described.

82. The combination with a calculating machine having a series of totalizers, of actuators therefor, two series of type operatively connected with the actuators, means for variably controlling the movements of the actuators, a series of hammers, resilient means for operating said hammers and causing said type to print a series of items and means to accumulate the printed items, substantially as described.

83. The combination of a calculating machine having a series of totalizers, actuators therefor, two series of type, means for variably controlling said type after the operation of the actuators, means to set said type to print items and to print totals as desired, a series of hammers and resilient means for operating the hammers causing the printing operation, substantially as described.

84. The combination of a calculating machine having two series of accumulator units, means for using either series of accumulators with the machine, two keys for connecting the register with either series of accumulators and a locking device for preventing the accidental operation of both of said keys, substantially as described.

85. The combination of a calculating machine having two series of totalizers, two sets of type correlated with the totalizers to print items accumulated thereon, two printing platens, means to cause the type to print selected items on each of said platens, shifting mechanism to connect either totalizer with the operating mechanism and a locking device for the machine when the change from one totalizer to the other is to be made, substantially as described.

86. The combination of a calculating machine having two series of totalizers, accessible means for clearing one series of totalizers at any time, normally inaccessible means to prevent the clearance of the other series of totalizers, a printing platen and means to cause the type to print selected items thereon which items are accumulated on the totalizers, substantially as described.

87. The combination of a calculating machine having two series of totalizers, each of which series may be operatively connected with the machine, means for effecting the change from one to the other series, two keys, a locking device for preventing the accidental operation of each key and a locking device for preventing the operation of the machine when the change is to be made, substantially as described.

88. The combination of a calculating machine having two series of totalizers, means whereby either series of totalizers may be rendered operative or inoperative, numeral keys correlated with the totalizers and means operated by the depression of the numeral keys for preventing the operating of the shifting devices, substantially as described.

89. The combination of a calculating machine having two series of totalizers, type correlated with the totalizers to print items accumulated thereon, two printing platens adjacent the type, means to cause the type to print selected items and a lock to prevent the operation of the printing devices, substantially as described.

90. The combination of a calculating machine having a series of totalizers, operating devices for said machine, a correction key, for returning the mechanism to its initial position should mistakes be made in setting the same, two sets of type correlated with the totalizers for printing items and totals and mechanical means for producing a uniform impression from the type at each printing place, substantially as described.

91. The combination of a calculating machine having a series of totalizers, type correlated with the totalizers to print items accumulated thereon, means to prevent the clearance of said totalizers to zero by the mere addition thereto of a suitable quantity and means to lock the entire machine out of use should an attempt be made so to clear the totalizers, substantially as described.

92. The combination of a calculating machine having a series of totalizers of type correlated with said totalizers to print items accumulated thereon, means to prevent the clearance of said totalizers to zero by the mere addition thereto of a suitable quantity, inaccessible means for permitting the clearance of said totalizers and normally inaccessible means for causing said type to print the totals on the totalizers, substantially as described.

93. The combination of a calculating machine having a series of totalizers, two sets of type correlated with the totalizers, means to prevent unauthorized persons from printing from one set of totalizers while the other set of totalizers and the machine may be used at will and a separate printing platen adjacent each set of type upon which the printing is accomplished, substantially as described.

94. The combination of a calculating machine having a series of totalizers, type correlated with the totalizers to print items thereon accumulated, normally inaccessible means to permit the clearance of said totalizers when necessary, a casing in which the machine is installed, a door through which access is had to said total setting mechanism and a lock for the door to prevent the unauthorized operation of said total setting mechanism when said door is closed, substantially as described.

95. The combination of a calculating machine having two series of totalizers, either of which may be operatively connected with the machine, type to print items accumulated on the totalizers, means to cause the type to print the totals on each set of totalizers and means whereby the accumulation on each of said totalizers will take place after the printing operation, substantially as described.

96. The combination of a calculating machine having a series of totalizers, type for printing items thereon accumulated, a notched supporting bar for said type, a spring for supporting the type over said notch and means whereby the type over said notch may be caused to make an impression when necessary, substantially as described.

97. The combination of a calculating machine having a series of totalizers, two series of type correlated with the totalizers to print items thereon accumulated, means to cause said type to print items or totals, means to lock said type in a fixed position until the accumulation on the totalizers has been started, and means to lock a book under one set of type till the accumulation has been started, substantially as described.

98. The combination of a calculating machine having two series of totalizers, type correlated with the totalizers to print items thereon accumulated, two keys for shifting the mechanism to operate either totalizer and a notched slidable bar for locking the shifting keys in either position, substantially as described.

99. The combination of a calculating machine having a series of totalizers therein, type correlated therewith, means to cause said type to print items accumulated on the totalizers, normally inaccessible means to cause said type to print the totals on said totalizers, a door through which access is had to said total printing mechanism, a lock for said door, a laterally movable platen on which the printing is done, means to cause said platen to be retracted into the machine and means to cause the printing to be done when the platen is so retracted, substantially as described.

100. In a pass book printer, a key controlled mechanism having a series of totalizers, a platen projecting therefrom, type adjacent said platen, means to retract said platen into the machine, means to print on said platen items which are accumulated on said totalizers, means to print the totals on said totalizers upon said platen, and means to return said platen to the initial position, substantially as described.

101. The combination with a calculating machine having two series of totalizers of two series of type for printing in two places, means whereby the type may be caused to print items or totals as desired, means to cause the successive printing operations at each printing place to be substantially uniform, and a platen movable into the machine adjacent one of said printing places and upon which one set of type makes its impression, substantially as described.

102. The combination of a series of accumulators, means to shift mechanism whereby either accumulator may be operated at will, a set of type, type setting devices, a connection whereby the positioning of the type setting devices may also cause the operation of either series of accumulators, and means whereby the mechanism may be locked into position with either series of accumulators, substantially as described.

In testimony whereof I have hereunto set my hand in the presence of two subscribing witnesses.

STUART F. SMITH.

Witnesses:
 FRANCIS M. WRIGHT,
 CARMEN C. E. GLAUCH.

Copies of this patent may be obtained for five cents each, by addressing the "Commissioner of Patents, Washington, D. C."